US009161025B2

(12) United States Patent
Flynn

(10) Patent No.: US 9,161,025 B2
(45) Date of Patent: Oct. 13, 2015

(54) EXTENDED OVERDRIVE TABLES AND USE

(75) Inventor: Mark F. Flynn, San Jose, CA (US)

(73) Assignee: zSpace, Inc., Mountain View, CA (US)

( * ) Notice: Subject to any disclaimer, the term of this patent is extended or adjusted under 35 U.S.C. 154(b) by 533 days.

(21) Appl. No.: 13/597,499

(22) Filed: Aug. 29, 2012

(65) Prior Publication Data
US 2013/0050422 A1 Feb. 28, 2013

Related U.S. Application Data

(60) Provisional application No. 61/528,457, filed on Aug. 29, 2011.

(51) Int. Cl.
H04N 13/04 (2006.01)
H04N 5/202 (2006.01)
G09G 3/00 (2006.01)

(52) U.S. Cl.
CPC ....... *H04N 13/0497* (2013.01); *H04N 13/0438* (2013.01); *G09G 3/003* (2013.01); *G09G 2320/0252* (2013.01); *G09G 2320/0257* (2013.01); *H04N 5/202* (2013.01)

(58) Field of Classification Search
CPC .......... H04N 13/0497; H04N 13/0404; H04N 13/0409
USPC ........................................................... 348/51
See application file for complete search history.

(56) References Cited

U.S. PATENT DOCUMENTS

2007/0285377 A1* 12/2007 Yamazaki ..................... 345/101
2008/0224981 A1 9/2008 Shen et al.
2008/0231624 A1 9/2008 Poon

* cited by examiner

*Primary Examiner* — Michael Lee
(74) *Attorney, Agent, or Firm* — Meyertons Hood Kivlin Kowert & Goetzel, P.C.; Jeffrey C. Hood; Mark S. Williams

(57) ABSTRACT

System and method for video processing. At least one overdrive (OD) look-up table (LUT) is provided, where the at least one OD LUT is dependent on input video levels and at least one parameter indicative of at least one attribute of the system or a user of the system. Video levels for a plurality of pixels for an image are received, as well as the at least one parameter. Overdriven video levels are generated via the at least one OD LUT based on the video levels and the at least one parameter. The overdriven video levels are provided to a display device for display of the image. The reception of video levels and at least one parameter, the generation of overdriven video levels, and the provision of overdriven video levels, may be repeated one or more times in an iterative manner to display a sequence of images.

31 Claims, 14 Drawing Sheets

EXTENDED OVERDRIVE TABLES AND USE

PRIORITY DATA

This application claims benefit of priority to U.S. Provisional Application Ser. No. 61/528,457, titled "Head Position and Temperature Based Overdrive Tables", filed Aug. 29, 2011, whose inventor is Mark F. Flynn, which is hereby incorporated by reference in its entirety as though fully and completely set forth herein.

TECHNICAL FIELD

This disclosure relates to the field of digital display, and more particularly to optimizing stereo video processing, e.g., for (simulated) 3D (three dimensional) display via extended overdrive tables.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

FIG. 1 illustrates a modern display chain, according to typical embodiments, which includes the following components:

1. GPU—Graphics Processing Unit. This component resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255.

3. Panel—This component is the display itself, typically a liquid crystal display (LCD), but other displays are possible, and takes as input the video levels (e.g., for R, G and B) for each pixel as output from the scaler, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Gamma

As used herein, the "gamma" process refers to a look-up table (LUT) which maps input levels to output levels, and its use, as is well known to those of skill in the art. FIG. 2 illustrates a typical gamma curve, per the prior art. Note that in this figure the concept of normalized video levels which span a range of 0 to 1 is used. To convert these values to a specific range (in this case from 0 to 255), one simply multiplies the normalized video level by the maximum of the range. For example, a normalized video level 0.5 scales to a video level of 128 (after rounding).

Overdrive

In the context of video processing and display, overdrive (OD) is a technique used to compensate for the finite response time of a display. This is of particular importance in LCDs, where the amount of light emitted by a pixel is controlled by a voltage, but is modified by the viscous properties of the liquid crystal (LC) material within the pixel. In other words, modern LC displays (LCDs) generally use overdrive to partially compensate for slow response times of the LC material in the LCD itself. This behavior can be used to provide the necessary responsiveness, and can be implemented in the LCD system as a table, e.g., a look-up table (LUT), referred to as an "overdrive table" (OD table), which maps all input video levels to the output level which comes closest to the desired optical response for that input level.

In the descriptions herein, time is measured in units of frames. A frame of time is the time for which one set of pixel data is shown on the display panel (of a display device). For a non-SD (non-stereo display), these data are typically updated at a rate of 60 Hz, which produces a frame time of $1/60 = 0.0166$ seconds, or 16.6 ms. For a time-sequential stereoscopic display, this is typically doubled to 120 Hz, so that a full left and a full right image can be shown at a rate of 60 Hz. In this case, the frame time is 8.3 ms.

FIG. 3 illustrates an example of the effect of slow LC response time, where a plot of luminance vs. time (in frames) is presented. As shown, at time 0, the voltage switches from that for level 0 to that for level m. As may be seen, it takes more than two frames for the optical output (measured in Luminance (L)) to rise to a steady state value of 0.6 (again, in normalized units). The value achieved at the end of 1 frame is only 0.3, or about a factor of 2 too low. FIG. 4 shows an additional curve, illustrating the response for an additional level m'. Note that its static level is higher than that of m, as it saturates at an L value of about 0.68; however, note further that at the end of one frame it happens to achieve the static level of m. Thus, if the panel were driven to level m' instead of to m, an adequate luminance level could be reached by the end of one frame.

The reason that the value at the end of the frame is so important is that, typically (and especially for SDs), the video level can change at the end of a frame, in which case the luminance level will never reach the static level.

The notion of frame-averaged luminance should be mentioned. What really matters to the user is the total luminance averaged over one frame. For traditional LCDs, the backlight is on all of the time, and so the frame-averaged luminance (referred to as L(m) for video level m) is just the optical response luminance averaged over one frame. Other possibilities are also possible; for example, it is common in time-sequential SDs to pulse the backlight for a short period of time (about 1 ms) at the very end of a frame, and to have the backlight off for the rest of the frame. In this case, L(m) is calculated the same way, but the averaging is only done over the time when the backlight is on.

This process can be expressed as an equation:

$$L(m) = \int_0^1 b(t) l(t,m) dt, \tag{1}$$

where $b(t)$ is the normalized time-dependent backlight luminance (0=off, 1=full on), and $l(t,m)$ is the time-dependent normalized luminance of the pixel when driven to video level m. L(m) is the luminance of a pixel driven to video level m, averaged over one frame, weighted by the backlight intensity during the frame. Turning now to FIG. 5, it will now be shown that the above approach is not sufficient to explain what is actually occurring.

The first part of this plot (of FIG. 5) is directed to Frame 1, where the pixel shows the static luminance over time for a video level m, which can be seen is a flat line, indicated by the Static L(m) portion of the plot. In Frame 2, the pixel voltage changes to that of a new video level n. This transition is very quick, and so the luminance reaches the static level L(n). In Frame 3, the pixel switches back to level m. This is a very slow transition, as can be seen by the shape of the curve, and therefore the luminance never reaches L(m) before it is switched again to video level n at the beginning of the next frame. The quantity L(m,n) is now defined as the time-averaged luminance when the pixel is switched to video level m, when it was in video level n in the previous frame. As may be seen, L(m,n) does not equal L(m) for all values of n, which may present a real problem for display performance. When the pixel is switched to video level m, L(m) is expected, but L(m,n) is what actually results. In other words, the resulting pixel behavior depends on what video level is being switched to, and what video level is being switched from.

This is where OD becomes relevant. As seen in FIG. 4, it may be possible to switch to another level m', rather than m, and still achieve the desired luminance. This, too, can be expressed as an equation:

$$L(m',n) = L(m) \quad (2)$$

Now, it is desirable that this be true for all n, which can be accomplished by defining a 2 dimensional LUT OD(m,n), which can be defined via the following equations:

$$L(OD(m,n), OD(n,m)) = L(m) \quad (3)$$

$$L(OD(n,m), OD(m,n)) = L(n) \quad (4)$$

In other words, rather than switching between levels m and n, one may switch between levels OD(m,n) and OD(n,m) in order to achieve the desired static luminance levels L(m) and L(n).

From the above equations, one can define an error function for each level (m, n), e.g.:

$$\Delta(m, n) = 200 * \frac{L(OD(m, n), OD(n, m)) - L(m)}{L(OD(m, n), OD(n, m)) + L(m)} \quad (5)$$

This is the percentage error of each dynamic level luminance L(m,n) relative to the average of the static level L(m) and the dynamic level L(m,n). A well designed OD LUT should minimize this error function for all values of (m,n).

There are many different ways of trying to satisfy these equations, including the following exemplary approaches:

First, these equations could be solved by trial and error. One could show various test images, showing various video levels (m,n) on the screen, and compare these via visual inspection, e.g., "by eye", to the corresponding images for the static video levels m. The OD entries could be adjusted by hand to achieve the best match of perceived luminances.

A improvement to this approach involves measuring the corresponding video level luminances, L(m,n) and L(m), and adjusting the OD entries to minimize the error function.

A third way is to do the above for some subset of the points, and then use interpolation to determine the remaining OD entries.

Note that in the above description, R, G, and B (sub-)pixels have not been discussed, but rather, just "the pixel"; however, generally there can be three gamma LUTs, and three separate OD LUTS, one of each for each color (sub-pixel), and they are at least close to operating independently. Thus, in some implementations, there may be a gamma LUT and an OD LUT provided for each color, e.g., for each type of sub-pixel.

Gray

Time Sequential Stereo Displays

Unlike a normal display, in a stereo display, there are two images—right and left. The right image must be delivered to only the right eye, and the left image must be delivered to only the left eye. In a time sequential stereo display, this separation of right and left images is performed in time, and thus, it must contain some time-dependent element which separates these two images. There are two common architectures.

The first architectures uses a device called a polarization switch (PS) which may be a distinct (separate) or integrated LC device or other technology switch, which is placed in front of the LCD panel (or any other type of imaging panel, e.g., an OLED (organic led emitting diode) panel), a plasma display, etc., or any other pixelated panel display used in a time-sequential stereo imaging system, specifically, between the LCD panel and the viewer, as shown in FIG. 6. The purpose of the PS is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

This allows achievement of the stereo effect shown in FIG. 7. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization, and the right lens will only pass the Right State polarization. In this way, separation of the right and left images is achieved.

In 3D display systems that rely on polarization switching to deliver distinct images to a user's left and right eyes, e.g., via polarized eyewear, the response time of the PS can also be problematic. More specifically, in addition to the slow LC response of the LCD, overall performance of the system may suffer do to the slow LC response time of the polarization switch (PS), and the optical leakage due to the non-perfect nature of the polarization control in the PS and the eyewear, where these effects depend on which eye us being used to view the display.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

However, as used in prior art systems, both of these architectures may have performance issues. For example, three problems typical in 3D display systems are:

1. In addition to the slow LC response of the LCD is the slow LC response time of the polarization switch (PS), and the optical leakage due to the non-perfect nature of the polarization control in the PS and the eyewear.

2. All of the additional effects mentioned above depend on which eye is being used to view the display.

3. The angle dependent dispersion of the light from the cells is non-isotropic, and therefore the color seen may vary based on the angle of view.

Moreover, the use of eye-dependent OD tables requires switching OD tables at full frame rate for optimal response, but may be accomplished at less than full frame rate for adequate response.

Therefore, improved techniques for video display are desired.

SUMMARY

Embodiments of a system and method for optimizing video display with extended overdrive look-up tables are presented.

At least one overdrive look-up table (OD LUT) may be provided, e.g., stored in a memory of the system, where the at least one OD LUT is dependent on input video levels and at least one parameter indicative of at least one attribute of the system or a user of the system.

The at least one parameter indicative of at least one attribute of a (video) system or a user of the system may be received. For example, in one embodiment, one or more sensors may measure or detect a level of the at least one attribute, and the at least one parameter may represent or codify the measured or detected level. Alternatively, in other embodiments, the at least one parameter may be provided manually, e.g., by the user, or may be provided by some other system communicatively coupled to the system. Examples of the at least one attribute include, but are not limited to, the user's point of view (POV), e.g., head position and/or orientation, or temperature, as discussed in more detail below.

As shown in 2002, at least one parameter indicative of at least one attribute of a (video) system or a user of the system may be received. For example, in one embodiment, one or more sensors may measure or detect a level of the at least one attribute (directly, or indirectly, as explained below), and the at least one parameter may represent or codify the measured or detected level, possibly via one or more correlations (as also described below in detail). Alternatively, in other embodiments, the at least one parameter may be provided manually, e.g., by the user, or may be provided by some other system communicatively coupled to the system. Examples of the at least one attribute include, but are not limited to, the user's point of view (POV), e.g., head position and/or orientation, or temperature, as discussed in more detail below.

Video levels for a plurality of pixels for an image may be received, e.g., from a GPU of the (video) system. In one embodiment, the video levels may be received to a video processing component in a video chain of the system, e.g., to a scaler or other portion(s) of the video chain implementing the video processing component. The video processing component may be included in a display device, e.g., a monitor, in a computer system, or even as a standalone device, as desired, and, as also indicated above, may be implemented in software, e.g., for execution by a processor and memory, or may be implemented in hardware, e.g., an ASIC or programmable hardware element, e.g., an FPGA, or any combination of the above.

Overdriven video levels may be generated (e.g., determined) via at least one OD LUT based on the video levels and the at least one parameter. In other words, rather than simply indexing into the (at least one) OD LUT with the video level(s), the at least one parameter is also used as an index. Said another way, the effective dimensionality of the OD LUT is extended to take the at least one parameter and the video level(s) as indices into the table, i.e., the OD LUT is extended by adding another dimension for each additional parameter. In various embodiments, the OD LUT may be a single multi-dimensional table, or some combination of (sub) tables that collectively operate as an extended OD LUT with the appropriate dimensionality.

The first overdriven video levels may be provided to a display device for display of the image. In some embodiments, the display device may be capable of stereo image display, e.g., for simulated 3D viewing, as described in more detail below.

In some embodiments, the method may include repeating said receiving video levels, said receiving at least one parameter, said generating overdriven video levels, and said providing the overdriven video levels, one or more times in an iterative manner to display a sequence of images.

Thus, embodiments of the method may utilize an extended overdrive table (or tables) to improve performance of video display systems. Further exemplary embodiments include the following:

POV Dependent OD LUTs

Attributes that may influence display response times include user POV and temperature of the display device, among others. Thus, in one exemplary embodiment, the at least one attribute includes a point of view (POV) of the user of the system. This may be an important consideration because the angle dependent dispersion of the light from the (pixel) cells is non-isotropic, and therefore the luminance and/or color may vary based on the angle of view, possibly at the pixel level.

POV may include a position of the user's head, and/or an orientation of the user's head, with respect to the display, or more specifically, with respect to a display panel or screen of the display device. For example, in one embodiment, a head tracking device may be coupled to the video processing component, and may be configured to detect the POV of the user. Receiving the at least one parameter may include receiving an indication of the POV from the head-tracking device. In some embodiments, the head tracking device may be worn by the user (may be head mounted), although in other embodiments, it may not be. For example, in one embodiment, the head tracking device may determine the POV "remotely", e.g., via a camera (or other type of sensor) with associated hardware or software that analyzes images (or other signals) of the user's head (or eyes) to determine the POV. Any other techniques for determining POV may be used as desired.

Thus, in one embodiment, the at least one parameter may be indicative of POV (of the viewer or user), and may be used to index into the (extended) OD LUT(s) for the generation of the overdriven video levels.

Temperature Dependent OD LUTs

The response time of some display technologies, e.g., LCDs, may depend on temperature. Accordingly, in some embodiments, the at least one attribute may include a temperature of at least one component of a display chain for the system. In one exemplary embodiment, the at least one component of the display chain for the system may be or include the display device, e.g., an LCD. More specifically, in some embodiments, the temperature of at least one component of the display chain for the system may be or include a temperature of a display panel of the display device. The temperature of the display panel may be determined via one or more sensors located on or near the display panel, or one or more sensors located on or near another component of the display chain, where the temperature of the other component of the display chain may be a proxy for the temperature of the display panel.

More generally, however, since the display characteristics depend on display temperature (or more specifically, the temperature of the display material, e.g., LC material), temperatures on or near the display panel may more accurately reflect those of the display material, and may be more easily measured, e.g., by situating one or more sensors on or near the display panel. For example, in one exemplary embodiment, one or more temperature sensors may be located on a main or primary electronics board mounted behind the display (or display panel), and measurements made by these sensors are indicative of the display temperature (or display panel temperature).

In other words, in some embodiments, the parameter may be indicative of display temperature (or display panel temperature) via correlation with one or more other measured temperatures. Since the temperature of the liquid crystal material in the display may be difficult to measure, in one exemplary embodiment, temperature(s) around the display may be measured, and then correlated to the LC temperature. For example, one or more temperature sensors may be placed in or around the system electronics, and each sensor's behavior monitored as the ambient temperature varied. Typically, if the sensors are near the display panel, the sensors more or less follow similar curves, e.g., with respective offsets, and so each of the sensors may be representative of the "temperature of the system", or more specifically, the display panel. Accordingly, any of the sensors may be used for operational measurements.

In other words, in some embodiments, the temperature of the display panel may be determined via the one or more sensors located on or near another component of the display chain operating as a proxy for the temperature of the display panel. Note that via such correlations, the at least one parameter is still indicative of the temperature of the display panel (or even the display panel materials (LC)).

Stereo Display With Extended OD LUTs

The extended OD LUT(s) may be used in combination with any of the stereo display systems and techniques described herein. For example, in some embodiments, the system may include or be coupled to a display device, which may be or include a display panel and a polarization switch (PS). The display panel used may be any LCD or any other type of pixelated panel display used in a time-sequential stereo imaging system, e.g., OLED, plasma display, etc. The image may be a stereo image that includes left and right images. The display device may be configured to display the left image on the display panel with the PS set to a first state, where the left image includes or utilizes light in a first polarized state, and display the right image on the display panel with the PS set to a second state, wherein the right image includes or utilizes light in a second polarized state, and where the second polarized state is orthogonal to the first polarized state. In other words, in some embodiments, the method may invoke display of the left image on the display panel with the PS set to the first state, where the left image includes light in the first polarized state, and invoke display of the right image on the display panel with the PS set to the second state, where the right image includes light in the second polarized state, where the second polarized state is orthogonal to the first polarized state.

As described below, any orthogonal polarized state pairs may be used as desired. For example, in one embodiment, the first and second polarized states may be or include orthogonal linear polarization states. In other embodiments, the first and second polarization states may be or include orthogonal circular polarization states. As further examples, combinations of such states may also be used, i.e., orthogonal elliptical polarization states.

In some embodiments, the system may also include or be coupled to eyewear. For example, in one embodiment, the system may include a panel display, and the eyewear may include a left shutter, a right shutter, and a shutter switch (SS) configured to switchably open and close the left shutter or the right shutter, thereby blocking one (or the other) eye's view of the panel display. The method may include displaying (or invoking display of) the left image to a user by opening the left shutter and closing the right shutter, and displaying (or invoking display of) the right image to the user by opening the right shutter and closing the left shutter.

In some embodiments, the extended OD LUT may be further expanded to include respective left and right OD LUTs (or sub-LUTs), as described above with respect to the section titled "Stereo Look-Up Tables" and the method of FIG. 9. For example, in one embodiment, the at least one OD LUT includes a left (extended) OD LUT and a right (extended) OD LUT. Thus, in some embodiments, the receiving video levels for a plurality of pixels for an image may include receiving first video levels for a plurality of pixels for a left image of a stereo image, and receiving second video levels for the plurality of pixels for a right image of the stereo image pair. Accordingly, in some embodiments, the generation of overdriven video levels via the at least one OD LUT based on the video levels and the at least one parameter may include generating first overdriven video levels via the left (extended) OD LUT based on the first video levels and the at least one parameter, and generating second overdriven video levels via the right (extended) OD LUT based on the second video levels and the at least one parameter.

Similarly, the provision of the overdriven video levels to a display device for display of the image may include providing the first overdriven video levels to the display device for display of the left image, and providing the second overdriven video levels to the display device for display of the right image.

Moreover, in one exemplary embodiment of this approach, the at least one attribute (according to which the OD LUT may be extended) may include a point of view (POV) of a user of the system, where the POV includes a position of the user's head, and/or an orientation of the user's head, with respect to the display, or more specifically, with respect to a display panel or screen of the display device. Alternatively, or additionally, the at least one attribute may include a temperature of at least one component of a display chain for the system, as discussed below in detail.

Gamma Compression with Extended OD LUTs

In some embodiments, the gamma compression techniques described herein may be used with embodiments of the extended OD LUT(s). For example, in one exemplary embodiment, the memory of the system may further store at least one gamma look-up table (LUT) that maps input video levels to gamma corrected video levels, where the gamma corrected video levels of the gamma LUT are constrained by a specified minimum value and/or a specified maximum value, thereby excluding values for which corresponding post-OD display luminance values differ from static display luminance values by more than a specified error threshold.

Accordingly, prior to using the extended OD LUT(s), input video levels for the plurality of pixels for the image may be received, and the received video levels mentioned above may be generated via the gamma LUT based on the input video levels, where the video levels are or include gamma corrected video levels that correspond to post-OD display luminance values that differ from corresponding static display luminance values by less than the specified error threshold, i.e., the first gamma corrected video levels may correspond to post- OD display luminance values that differ from corresponding static display luminance values by less than the specified error threshold. In some embodiments, the video levels may include respective color video levels for respective color sub-pixels, where the at least one gamma LUT includes respective gamma LUTs for the color video levels. Moreover, in some embodiments, dual or stereo gamma tables may be used, e.g., as described herein. Thus, in one exemplary embodiment (with three colors), the method may utilize 6 gamma LUTs (left and right gamma LUTs for each of the three colors or color channels) and 6 extended OD LUTs (left and right OD LUTs for each of the three colors, extended to further depend on the at least one parameter/attribute). Note, however, that the number and types of tables utilized may be different, depending on the number and types of colors or color channels supported. Alternatively, in some embodiments, the same tables may be used for all the colors, e.g., a left extended OD LUT for all colors, a right extended OD LUT for all colors, etc.

Thus, in some embodiments, each of the first and second video levels may include respective color video levels for respective color sub-pixels. The gamma LUT may include respective gamma LUTs for different color video levels, the left (extended) OD LUT may include respective left (extended) OD LUTs for the different color video levels, and the right (extended) OD LUT may include respective right (extended) OD LUTs for the different color video levels.

Thus, various embodiments of the systems and methods disclosed herein may utilize extended OD LUTs to improve performance of video systems.

BRIEF DESCRIPTION OF THE DRAWINGS

A better understanding of the present disclosure can be obtained when the following detailed description of the preferred embodiment is considered in conjunction with the following drawings, in which.

Figure 1:
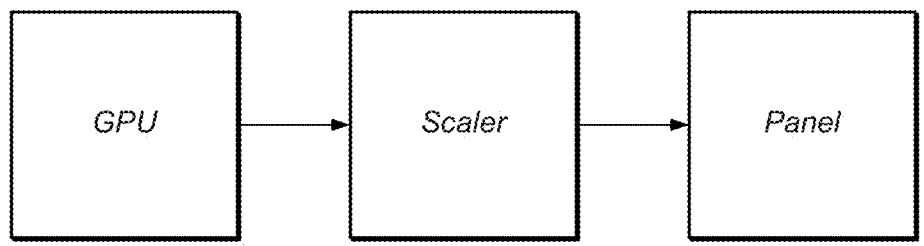
FIG. 1 illustrates a modern display chain, according to the prior art.
Figure 2:
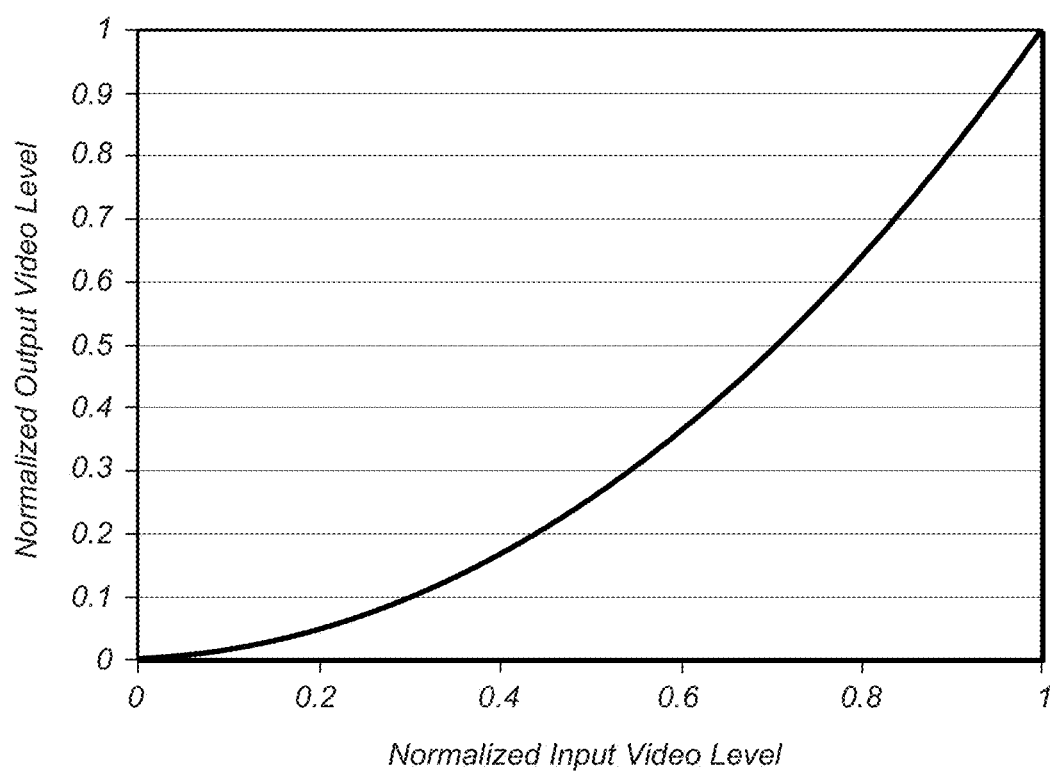
FIG. 2 illustrates a typical gamma curve, according to the prior art.
Figure 3:
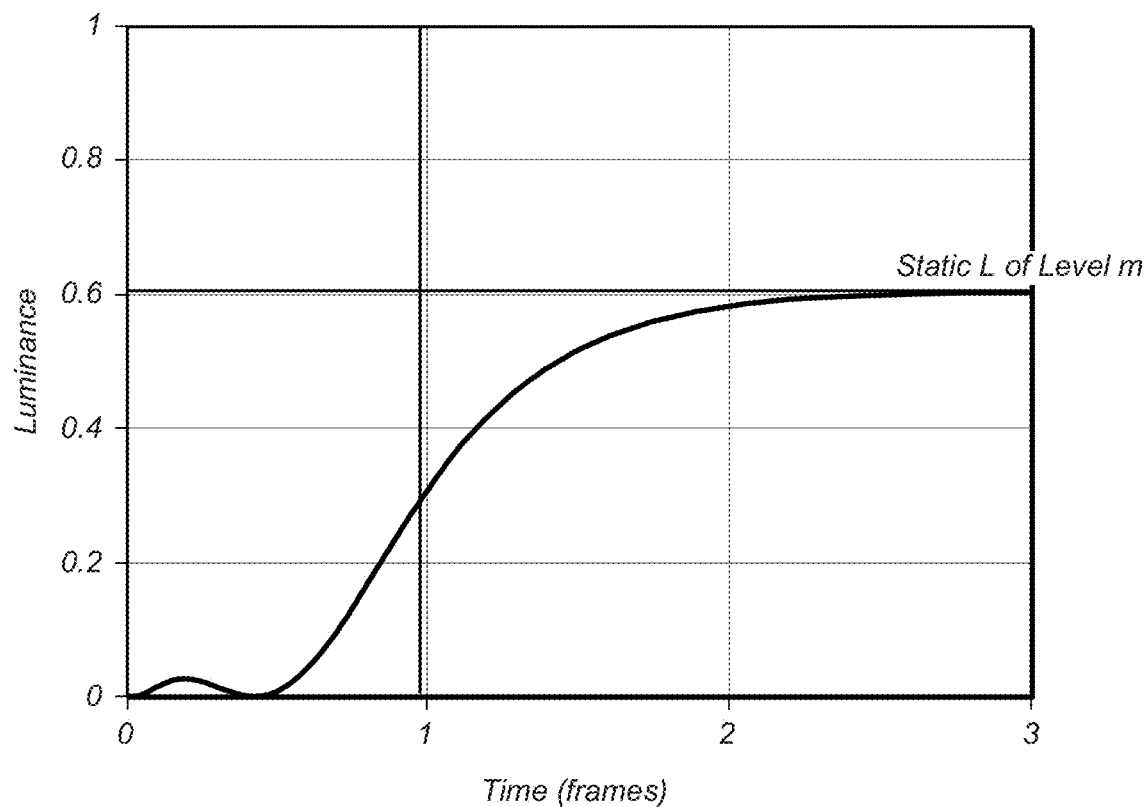
FIG. 3 is a plot of luminance vs. time that illustrates voltage level switching delays.
Figure 4:
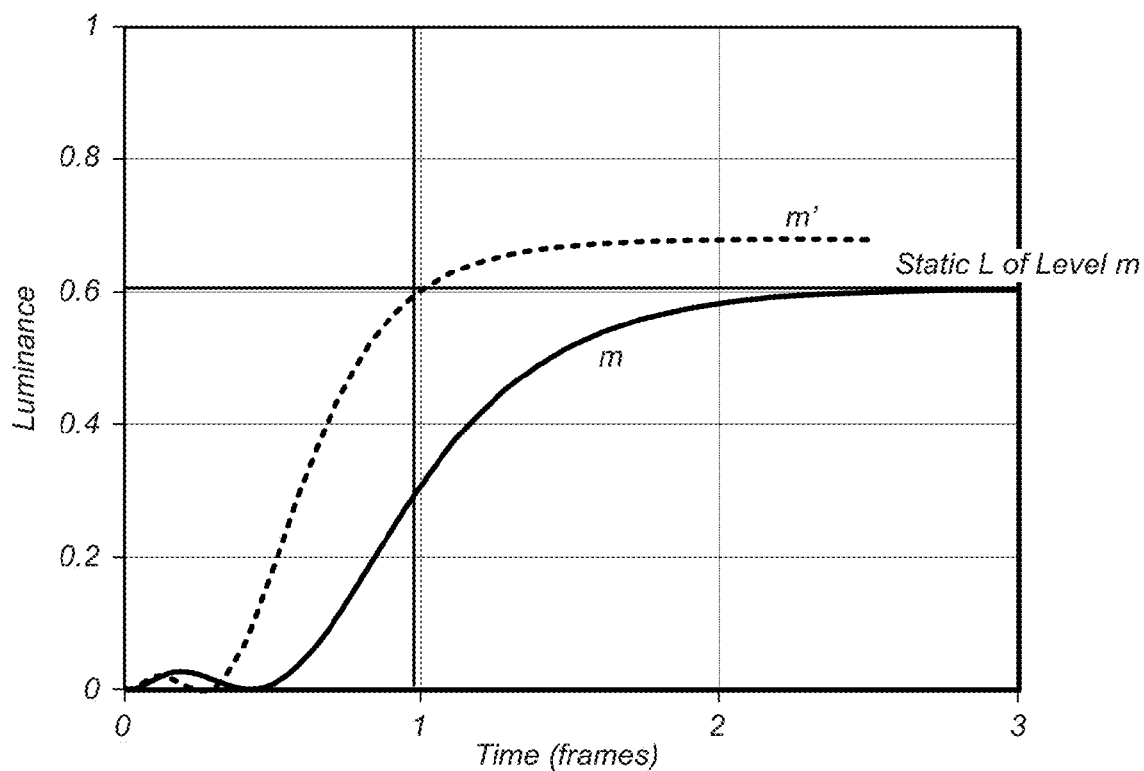
FIG. 4 is a plot of luminance vs. time that illustrates the use of overdrive to adjust for the slow response time of FIG. 3.
Figure 5:
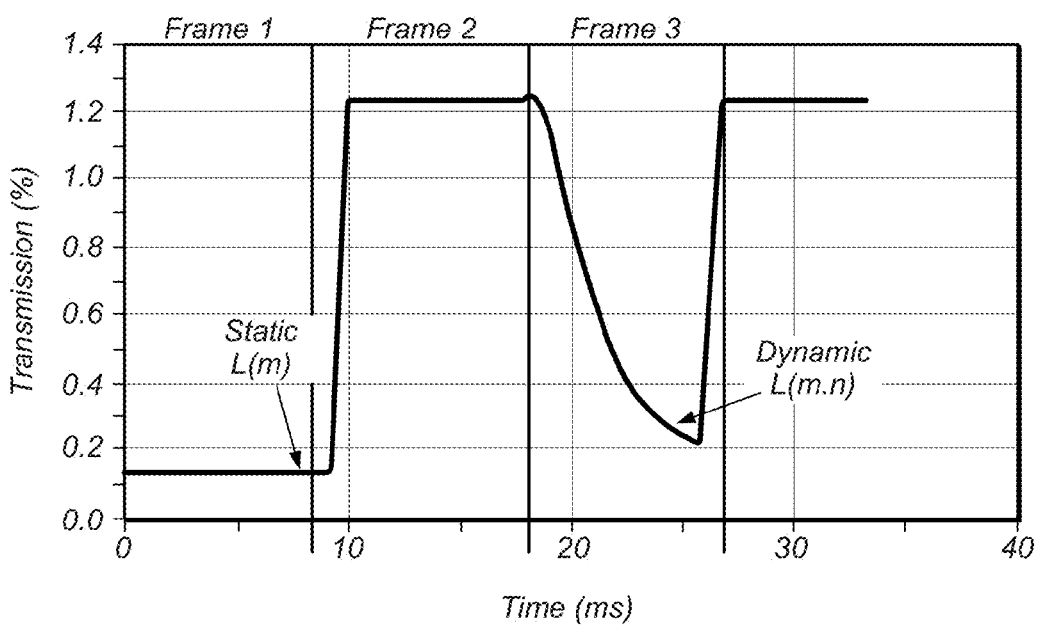
FIG. 5 illustrates switching dependence of time-averaged luminance.
Figure 6:
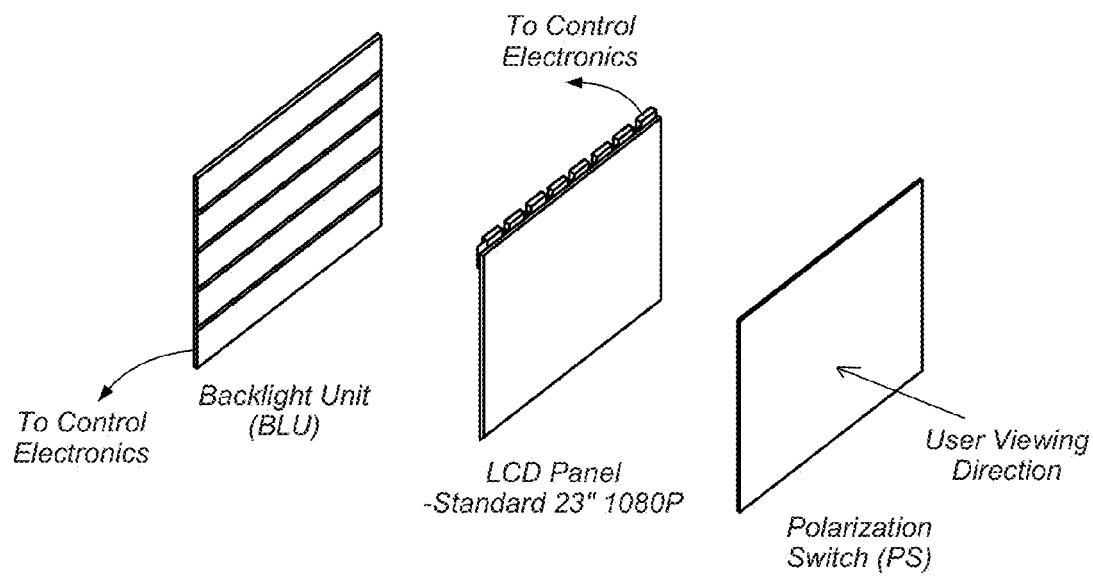
FIG. 6 illustrates an architecture that utilizes a polarization switch, according to the prior art.
Figure 7:
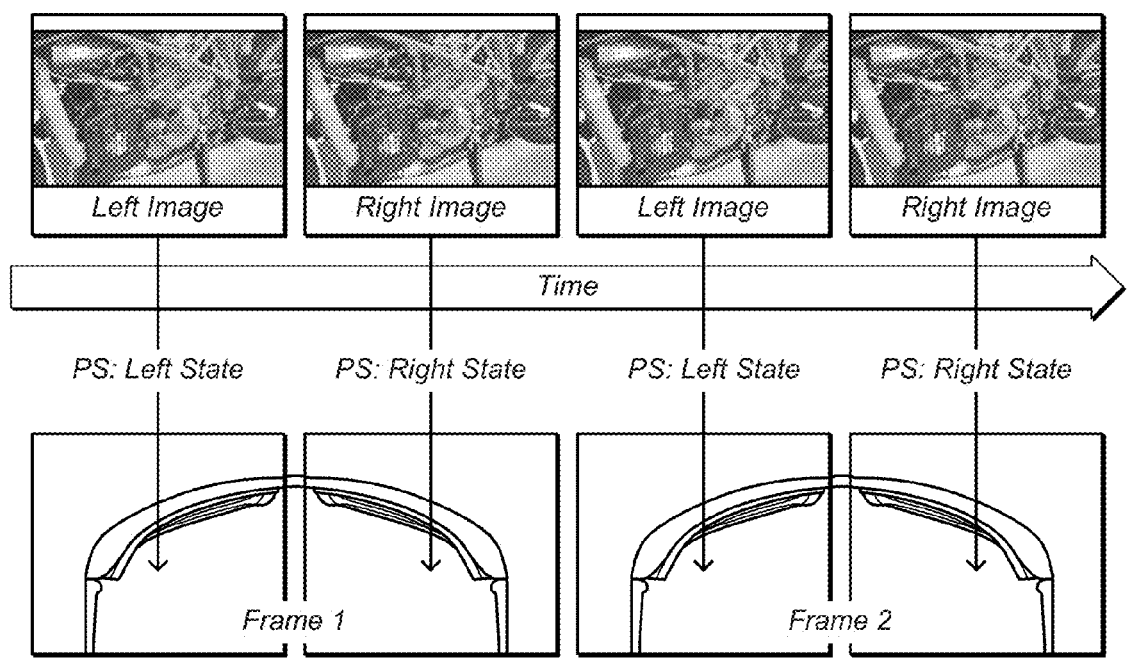
FIG. 7 illustrates a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Incorporation By Reference

The following references are hereby incorporated by reference in their entirety as though fully and completely set forth herein:

U.S. Provisional Application Ser. No. 61/528,457, titled "Head Position and Temperature Based Overdrive Tables", filed on Aug. 29, 2011.

U.S. Provisional Application Ser. No. 61/491,052, titled "Three Dimensional Presentation Development System", filed May 27, 2011.

U.S. patent application Ser. No. 13/481,243, titled "Optimizing Stereo Video Display", filed on May 25, 2012.

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

U.S. patent application Ser. No. 17/797,958, titled "Presenting a View within a Three Dimensional Scene", filed on Jun. 10, 2010.

U.S. patent application Ser. No. 13/110,562, titled "Liquid Crystal Variable Drive Voltage", filed on May 18, 2011.

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Comprising—this term is open-ended. As used in the appended claims, this term does not foreclose additional structure or steps. Consider a claim that recites: "A system comprising a display . . . . " Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Liquid Crystal Addressable Element (LCAE)—this term refers to a region of an LC device that can be independently (electronically) controlled. For example, for a LC Display (LCD). The LCAE is a pixel.

Figure 8:
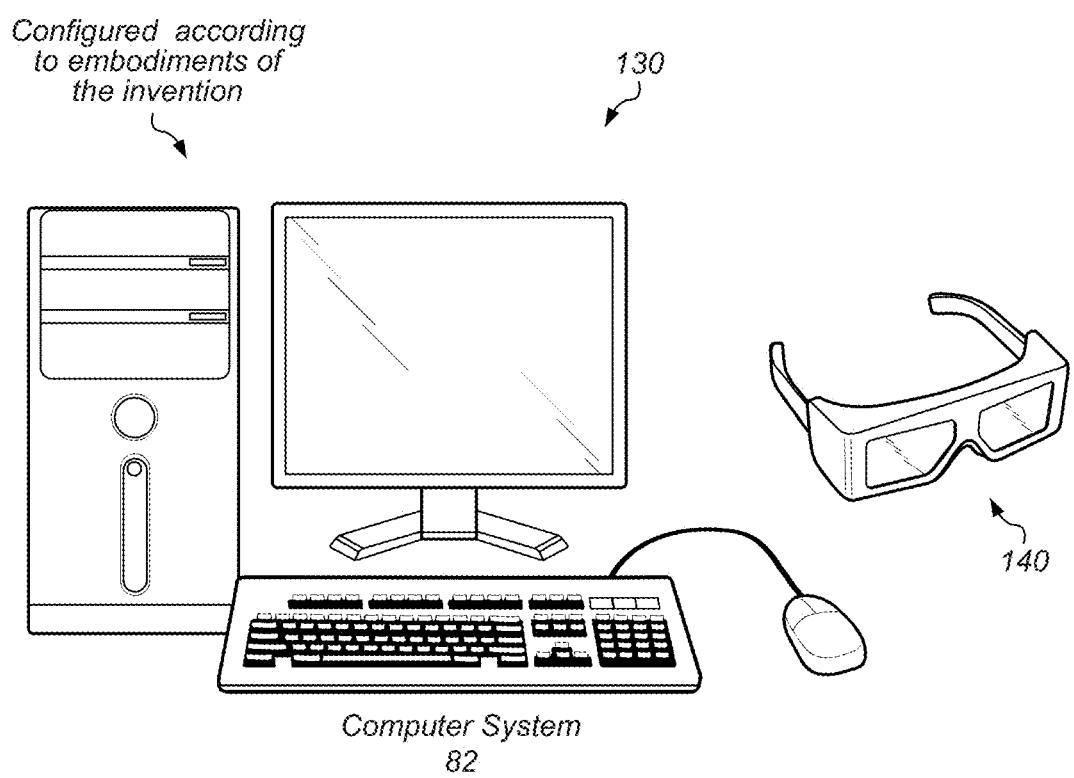
FIG. 8 illustrates an exemplary system configured to implement various embodiments.

FIG. 8—Computer System

FIG. 8 is a high level block diagram of an exemplary system configured to implement various embodiments. As shown in FIG. 8, a computer system 82 may include one or more display devices, including, for example, a "stereo-capable" monitor 130 and stereoscopic (e.g., "3D") eyewear 140, e.g., shutter glasses.

The computer system 82 may include at least one memory medium on which one or more computer programs or software components according to one embodiment of the present invention may be stored. For example, the memory medium may store one or more programs which are executable to perform the methods described herein. The memory medium may also store operating system software, as well as other software for operation of the computer system. In some embodiments, the memory medium may store firmware implementing at least a portion of the techniques described herein. Various embodiments further include receiving or storing instructions and/or data implemented in accordance with the foregoing description upon a carrier medium.

It should be noted that in various other embodiments, the system may be implemented with a workstation, or dedicated hardware (e.g., as opposed to a standard personal computer (PC) or workstation), such as a computing device configured with an ASIC (application specific integrated circuit) or programmable hardware element, e.g., a field programmable gate array (FPGA), among others. Moreover, as explained below, in further embodiments, any of various display techniques and devices may be used as desired, including, for example, stereoscopic display techniques and devices. Similarly, any types of memory may be used as desired, including volatile memory mediums such as RAM, or non-volatile memory mediums, e.g., EEPROMs, e.g., configured with firmware, etc., as desired.

Stereo Look-Up Tables

In time sequential stereo display systems, the presence of a PS may affect the OD LUT entries in two ways. First, remember that the OD LUT is designed to compensate for the slow response time of the LCD (or any other type of pixelated display panel used in a time-sequential stereo imaging system, e.g., OLED display panel, plasma display panel, etc.). The PS is another liquid crystal device, although it covers the entire display. The PS thus has its own response time, and therefore affects the solution of the OD table equations presented above. Moreover, the response time for the PS is different, depending on whether the system is switching from the Left State to the Right State, or vice versa. Accordingly, in some embodiments, two OD tables (for each color) may be utilized, a right OD LUT optimized for viewing "right" images by the right eye, and a left OD LUT optimized for viewing "left" images by the left eye. Note that in order to operate, the system or process must be aware of which images entering it are left and which are right. This can be done in various ways, and are known to those skilled in the art. One such way is to embed metadata in the video stream indicating whether a given frame is a left or a right image frame, and this can be interpreted by whatever functional unit (processor, circuitry, etc., of the video processing component) is implementing the OD (e.g., the GPU, video scaler, display panel, etc.), although any other techniques may be used as desired.

It should be noted that the values returned from the left and right OD LUTs depend not only on the video levels for the current frame, but also on the video levels from the immediately previous frame. Thus, in general, each OD LUT is a 2-D table accessed with video level values of these two frames. Note further that in time sequential stereo display systems, the two frames refer to left and right video images (or right and left video images). Note as well that while OD LUTs may be described as distinct tables, e.g., left and right tables, these same OD LUTs may be implemented via a single OD LUT with one or more additional dimensions, which is functionally equivalent. Similar increases in dimensionality can accommodate otherwise distinct OD LUTs, e.g., per color, etc., as desired. Thus, in various embodiments, the techniques and OD LUTs disclosed herein may be implemented in one or more OD LUTs with appropriate dimensionalities as desired.

These concepts can also be applied to gamma correction, as will be described in more detail below. In other words, in some embodiments, two gamma LUTs (for each color) may be utilized, a right gamma LUT optimized for viewing "right" images by the right eye, and a left gamma LUT optimized for viewing "left" images by the left eye. Further details regarding embodiments of the system and its functionality are described below.

Figure 9:
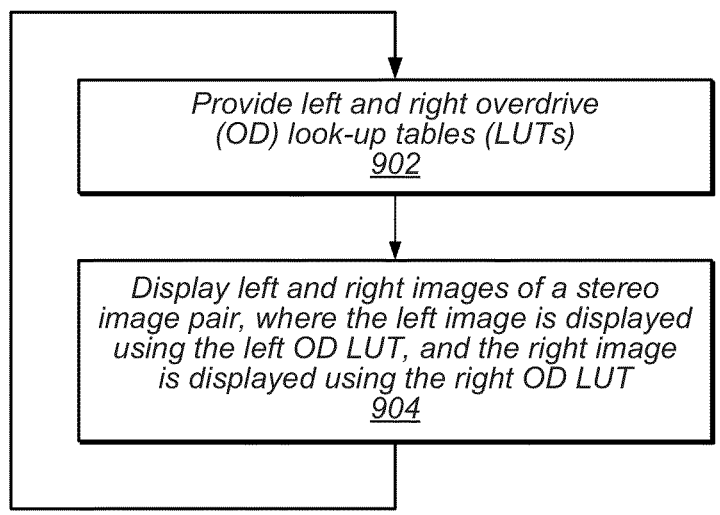
FIG. 9 is a flowchart illustrating one embodiment of a method for stereo video display, according to one embodiment.

FIG. 9—Method for Stereo Display Using Multiple Overdrive Look-Up Tables

FIG. 9 illustrates a method for stereo display, e.g., for simulated 3D viewing, using multiple OD tables. The method shown in FIG. 9 may be used in conjunction with any of the computer systems or devices shown in the figures, among other devices. In various embodiments, some of the method elements shown may be performed concurrently, in a different order than shown, or may be omitted. In some embodiments, the method may include additional (or fewer) method elements than shown. As shown, the method may operate as follows.

In 902, a left OD LUT (overdrive look-up table) and a right OD LUT may be provided (e.g., received from a memory, another component, a server, mass storage, etc.). In some embodiments, the left and right OD LUTs may be generated. In other words, values or entries for left and right OD LUTs for use in video display may be determined, and the tables populated accordingly. The tables may be generated via any of a variety of techniques, discussed below.

In 904, left and right images of a stereo image pair may be displayed (e.g., simultaneously, or in succession), where the left image is displayed using the left OD LUT, and the right image is displayed using the right OD LUT. In other words, the method may switch between the two OD LUTs such that when the system (or method) displays a left image, the system (or method) uses the left OD LUT, and when this system (or method) displays a right image, the system (or method) uses use the right OD LUT.

As indicated by the arrow, method element 904 may be repeated in an iterative manner, e.g., with successive stereo image pairs. The use of the left and right OD LUTs may improve performance of the system in that overdrive is optimized per eye (or per stereo visual channel).

Additionally, as noted above in the Background section, video levels generally include levels for multiple colors, e.g., R, G, and B sub-pixels, and so even in mono (non-stereo) systems, generally there can be multiple (e.g., three) gamma LUTs, and multiple (e.g., three) separate OD LUTS, one of each for each color, and they are at least close to operating independently.

Accordingly, in some embodiments, there may be a gamma LUT and an OD LUT (for mono systems) or a pair of OD LUTs (for stereo systems), for each color, e.g., for each type of sub-pixel, as described below in detail (see the Further Exemplary Embodiments section below).

Now, as it happens, there are values for (m,n) for which there are no acceptable solutions to the OD equations presented above, or for which the resulting values are not within some specified tolerance or error. In other words, there are values for (m,n) where the (magnitude of the) error function $\Delta(m,n)$ given above (Equation (5)) cannot be decreased to an acceptable level for some range or subset of levels (m,n).

Figure 10:
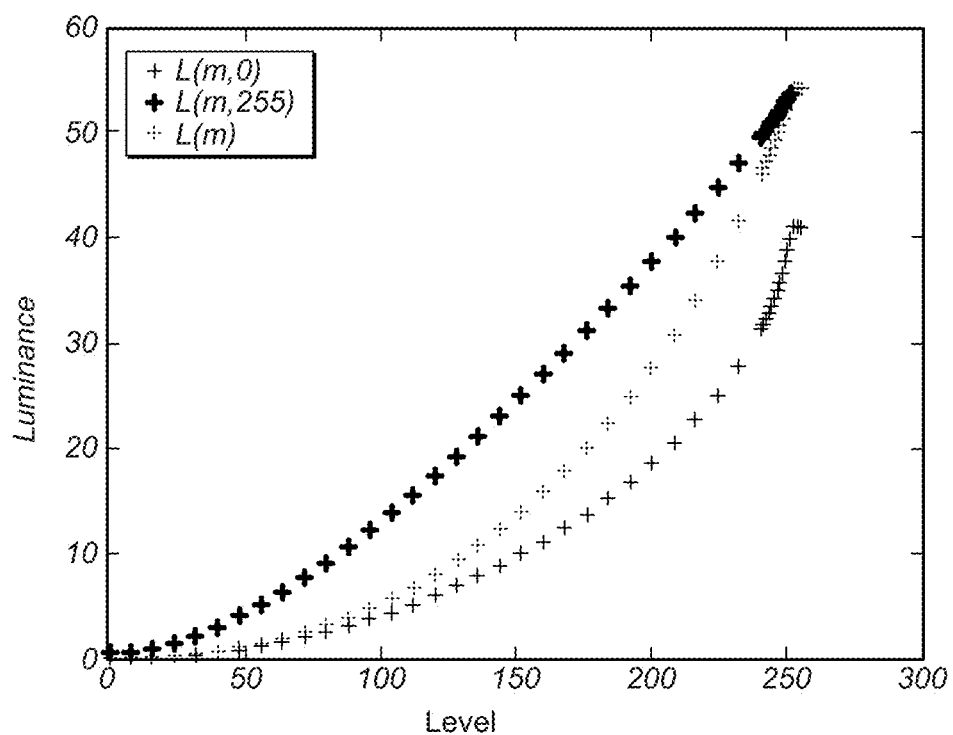
FIG. 10 illustrates three different luminance curves as functions of video levels, according to one embodiment.

FIG. 10 illustrates three different curves: the bottom curves represents $L(m,0)$, i.e., luminance as a function of video level m, when the other frame video level is frozen at 0; the top curves represents $L(m,255)$, i.e., luminance as a function of video level m, when the other frame video level is frozen at 255 (in this case, the maximum value); and the middle curve represents $L(m)$, which is the static luminance as a function of m. (Note that the last entry of $L(m)$, i.e., $L(255)$ is also equal to $L(m,m)$, i.e., $L(255,255)$.)

As may be clearly seen in FIG. 10, $L(255,0)$ is $<<L(255, 255)=L(255)$. In other words, the bottom curve at video level $m=255$ is much lower than the other two curves for a wide range of values of m. This has a significant impact on the OD equations, because it means is that for $m=255$ and $n=0$, there is no acceptable solution to the OD equations. In other words, in attempting to solve the equations, one tries to find LUT entries such that $L(OD(255,0), OD(0,255))$ is equal to the static luminance level $L(255)$. If the other frame video level n is frozen at level 0, then there is no such level—all of the levels are too dark.

It turns out that there are many values of (m,n) near this extreme point (255,0) where this is the case—the OD LUT equations cannot be solved within a specified error threshold (including values for which there are no solutions at all).

Figure 11:
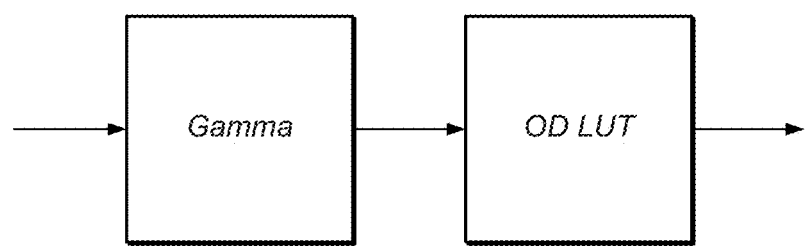
FIG. 11 illustrates a simplified block diagram of a video scaler, according to one embodiment.

However, there is a way to avoid these regions. FIG. 11 illustrates a simplified block diagram of a video processing component that implements embodiments of the constrained gamma and (stereo) overdrive functionality disclosed herein. Note that while in some embodiments, the video processing component may be implemented in or by a video scaler, in other embodiments, the video processing component may be implemented by or included in any of the devices or elements of the video chain, including one or more of the GPU, scaler, or display device (e.g., panel), or even a standalone device, among others, as desired, so long as the gamma functionality is performed prior to the overdrive functionality. Note that the video processing component may be configured to perform any of the methods disclosed herein, or any combinations of method elements thereof.

Figure 12:
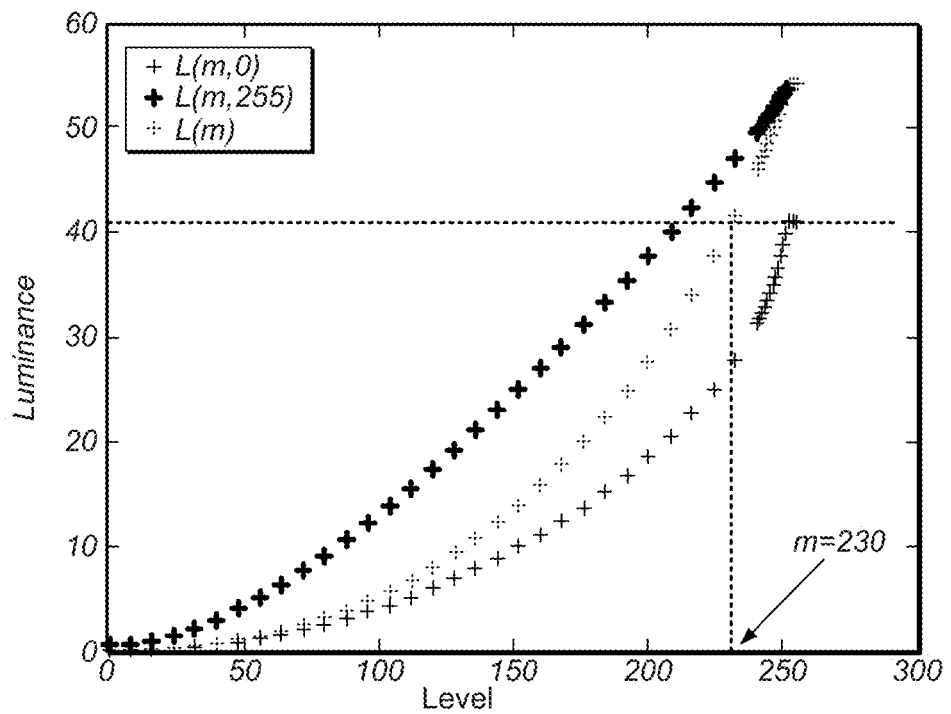
FIG. 12 illustrates the three different luminance curves of FIG. 10, but with dashed lines indicating a maximum value constraint, according to one embodiment.

In the embodiment shown, a gamma LUT is inserted (or used) before the OD LUT, referred to herein as LUT $G(m)$. A condition can be imposed on the gamma LUT $G(m)$ such that there is a maximum value that it can output. For example, in one embodiment, $G(255)$ may be set as described in FIG. 12. This is the same data shown in FIG. 10, but a horizontal line has been added at the luminance level $L(255,0)$, as well as a vertical line dropping from the point where the horizontal line intersects the curve $L(m)$ (the static display luminance). In this example, the vertical line occurs at the video level $m=230$. If the condition $G(255)=230$ is imposed, then all or substantially all of the levels around the point (255,0) where there is no OD LUT solution will never be used, because the system, e.g., a "Gamma block" of the system, e.g., the constrained gamma LUT G(m), may never allow such values to be passed to the OD block in the video processing component.

Figure 13:
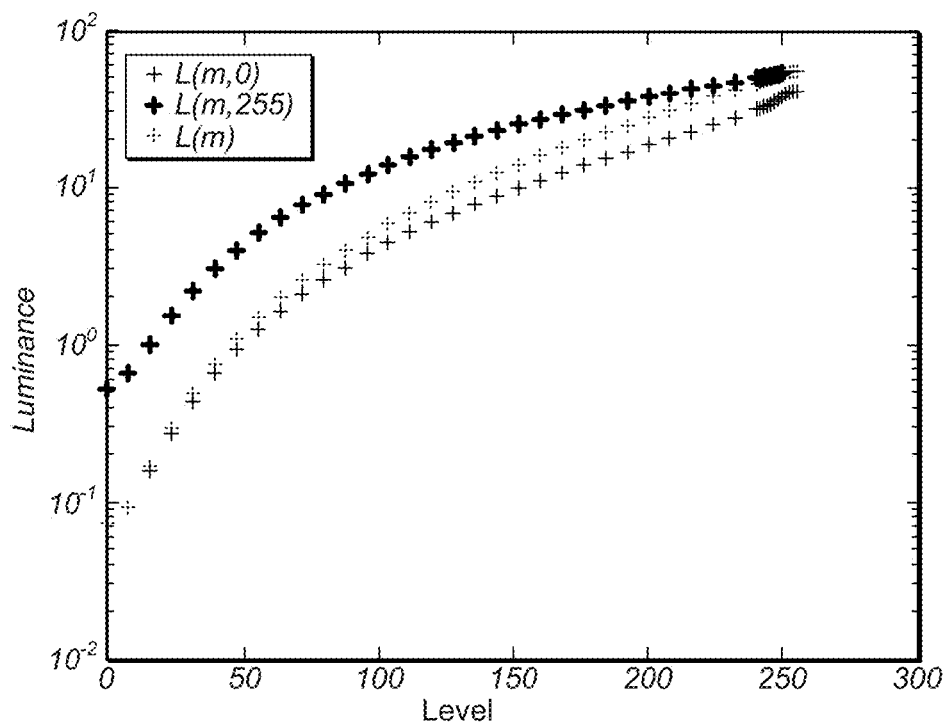
FIG. 13 illustrates the three different luminance curves of FIG. 10 on a log scale, according to one embodiment.
Figure 14:
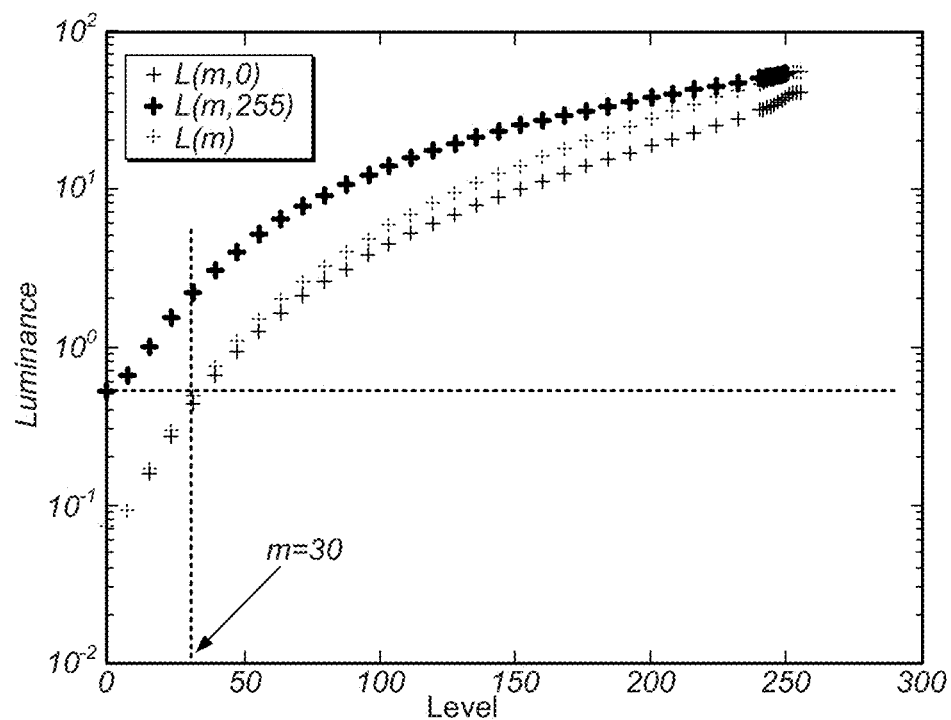
FIG. 14 illustrates the three different luminance curves of FIG. 13, but with dashed lines indicating a minimum value constraint, according to one embodiment.

FIG. 13 illustrates that a similar problem occurs for low values of m, and shows the same data as FIGS. 10 and 11, but on a vertical log scale. As can be seen, the curve L(m,255) does not drop to as low a value as L(m,0) or L(m). Therefore, there is another region around (0,255) where there are no solutions to the OD equation. This region can be avoided in a similar manner as above. As shown in FIG. 14, if the lower level gamma value G(0) is set to 30 (in this exemplary case), then this region is excluded as well. Note that the table values may be constrained in any manner desired, e.g., via a minimum value, via a maximum value, both a minimum value and a maximum value, or even one or more interior ranges, among others.

In summary, by limiting the range over which gamma is allowed to vary before the OD LUT is applied, e.g., via a constrained gamma LUT, large regions of the OD LUT for which there is no solution, or at least no solution within a specified error, can be excluded. Note, however, that this still leaves open the question of what values to set the gamma LUT values to between these limits points. If G(0)=Gmin, and G(255)=Gmax, what are the other values of the constrained gamma LUT?

Figure 15:
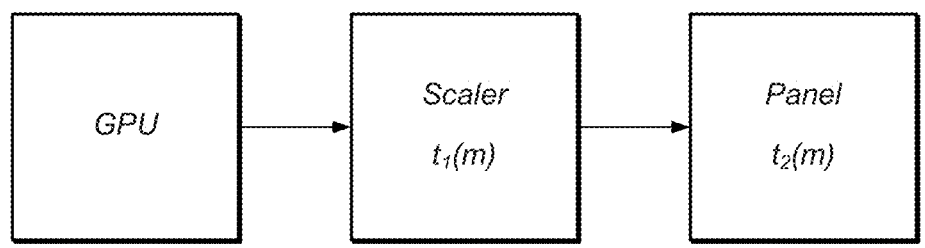
FIG. 15 illustrates a modified embodiment of the end to end video chain of FIG. 1, according to one embodiment.

Referring now to FIG. 15, which shows an exemplary (and modified) embodiment of the end to end video chain of FIG. 1, note that the scaler (or other portion of the video chain or video processing component) can insert or utilize a constrained gamma LUT (e.g., per FIG. 11) before OD. This gamma may be designated as $t_1(m)$, and in some embodiments, may be equal to, or close to, a linear ramp, as shown below. In this case, the "scaler" gamma has no effect:

$$t_1(m)=m \qquad (6)$$

Figure 16:
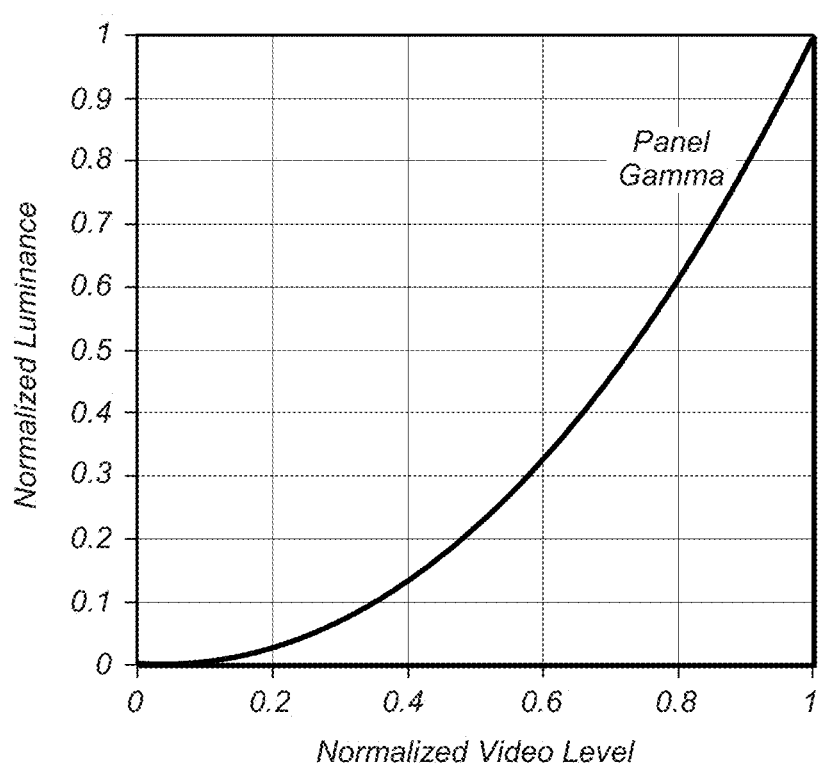
FIG. 16 illustrates an exemplary plot of normalized luminance as a function of normalized video levels, according to one embodiment.

Note that in some embodiments, the (display) panel may have its own gamma (function or values), designated in FIG. 15 as $t_2(m)$. An exemplary version of this function may typically look like the curve shown in FIG. 16. The shape of this display gamma curve is typically chosen to give the display the best possible appearance. It may also be quite difficult to modify this function, as it may be designed into the display.

Note that once $t_1(m)$ is set to something other than a linear ramp, the overall display system may have a new overall gamma, which is $t_2(t_1(m))$, i.e., the output of $t_1(m)$ may be used to determine the gamma value for the display, i.e., the "display gamma".

Therefore, the gamma limits or constraints in the video processing component, e.g., the scaler (or other element(s)), may be imposed or implemented by changing the shape of $t_1(m)$ without changing the shape of the overall gamma $t_2(t_1(m))$ curve or function.

To see how this may be accomplished, consider the following specific example:

It is common to assume that a display gamma (function) is a simple power law of the input video level, specified by a power $\gamma$. A common value of $\gamma$ is 2.2. In this case, the following may be obtained in the absence of $t_1$:

$$t_2(m)=m^\gamma \qquad (7)$$

With $t_1$, one has instead:

$$t_2(t_1(m))=t_1(m)^\gamma=am^\gamma+b \qquad (8)$$

Here the total system gamma has been chosen to have the same functional form as the standard gamma, with the same power law, but has been modified so that output limits can be imposed. Now a and b can be solved for as follows:

First, solve for $t_1$:

$$t_1(m)=[am^\gamma+b]^{1/\gamma} \qquad (9)$$

Then impose the boundary conditions discussed above:

$$t_1(0)=[b]^{1/\gamma}=G\text{min} \qquad (10)$$

$$t_1(1)=[a+b]^{1/\gamma}=G\text{max} \qquad (11)$$

This allows a and b to be solved for as follows:

$$b=G\text{min}^\gamma \qquad (12)$$

$$a=G\text{max}^\gamma-G\text{min}^\gamma \qquad (13)$$

Figure 17:
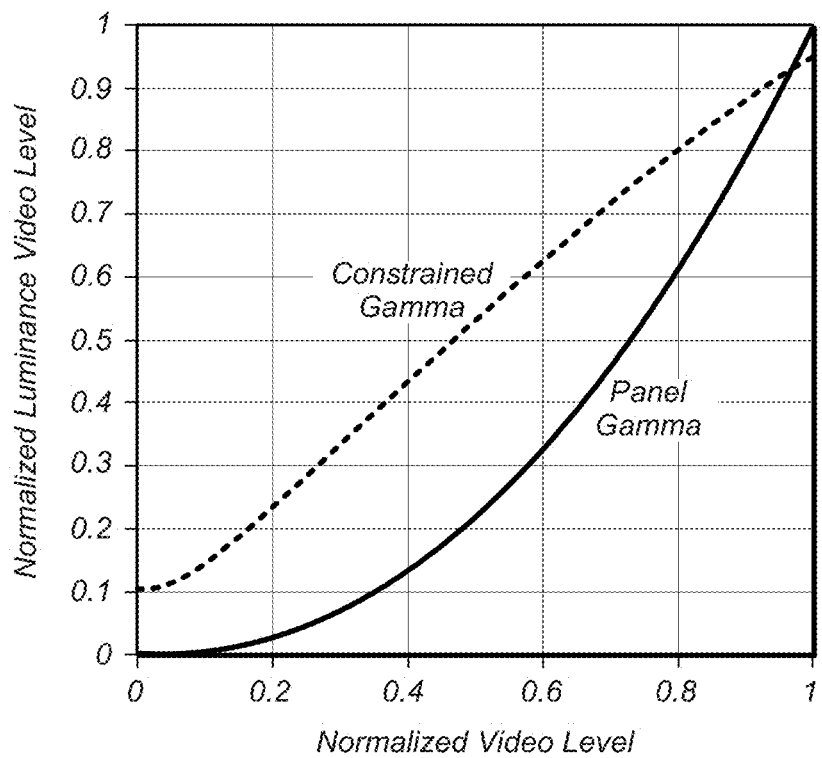
FIG. 17 illustrates an exemplary constrained gamma function, e.g., with imposed boundary constraints, according to one embodiment.

This result may produce a curve for $t_1$, an exemplary embodiment of which is shown in FIG. 17, i.e., a gamma function with imposed boundary constraints. Note that the technique described may thus result in an end to end system gamma (function) with the desired shape, but such that inputs to the OD LUT are limited so as to avoid regions of no or poor solutions. As indicated above, in some embodiments, such a curve may specify the gamma LUT.

It should be noted that there are numerous other possible ways of constructing the gamma LUT, the above being but one exemplary approach. For example, it is common in various video specifications to impose a linear ramp at the very low video levels. An example of this is the Rec. 709 video standard, wherein normalized video levels below the value of 0.081 are fit to a linear ramp rather than the power law presented above. However, in all cases, whatever form the desired system gamma takes, the above approach can be applied.

To make this clear, below is shown the general case where the function $t_2(m)$ can take any form. In this case, Equation (9) above may assume the following form:

$$t_1(m)=t_2^{-1}(am^\gamma+b) \qquad (14)$$

In Equation (14), $t_2^{-1}$ indicates the inverse of the function $t_2$, not the function raised to a power. In this way, a completely general function can be used, and the limits (or constraints) can be calculated as follows:

$$a=t_2(G\text{min}) \qquad (15)$$

$$b=t_2(G\text{max})-a \qquad (16)$$

The key idea is to impose limits Gmin and Gmax on the LUT, thereby restricting operation of the system to domains where acceptable solutions obtain. Note further that it is not necessary to impose the limits exactly as specified above. For example, it may result in a more pleasing image if these limits are somewhat relaxed, i.e., to allow some video levels through with values below Gmin or above Gmax, e.g., via specified tolerance levels. In other words, the limits may be imposed as "soft" limits, where minor violations may be tolerated.

Figure 18:
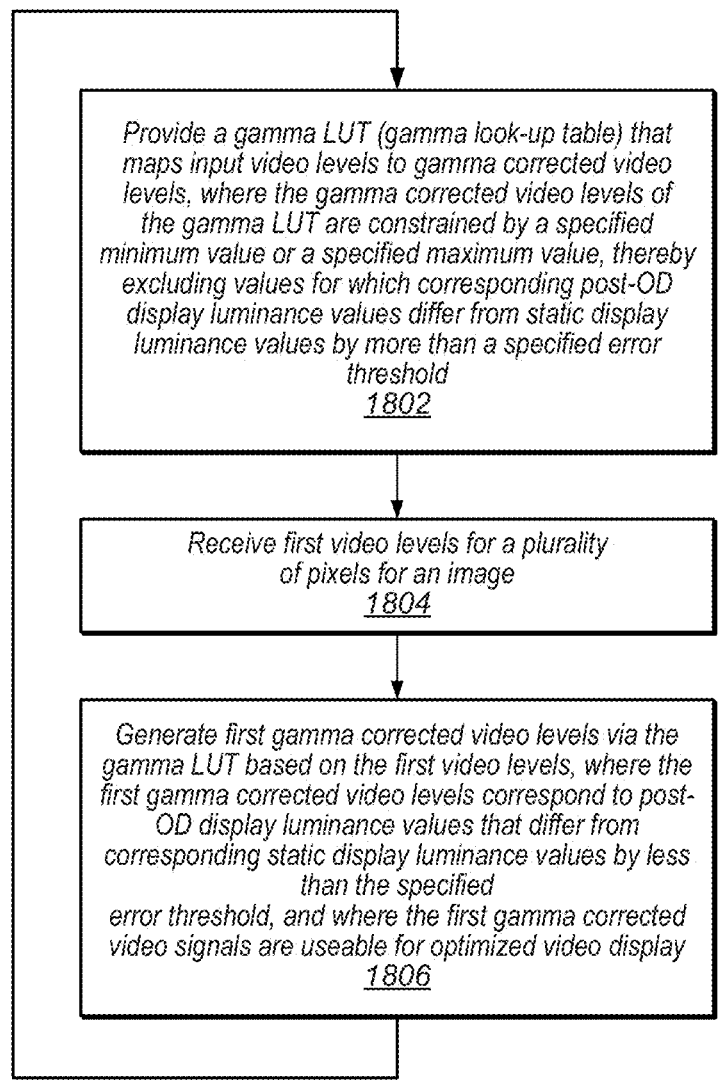
FIG. 18 is a flowchart illustrating one embodiment of a method for video display using a constrained gamma table, according to one embodiment.

FIG. 18—Method for Video Display

FIG. 18 is a flowchart illustrating one embodiment of a method for video display using a constrained gamma table, according to one embodiment. The method shown in FIG. 18 may be used in conjunction with any of the computer systems or devices shown in the figures, among other devices, including any of various types of display device, e.g., any type of pixelated panel display used in a time-sequential stereo imaging system, e.g., LCD, OLED, plasma, etc., as desired. In various embodiments, some of the method elements shown may be performed concurrently, in a different order than shown, or may be omitted. In some embodiments, the method may include additional method elements, or fewer method elements than shown. As shown, the method may operate as follows.

As shown in 1802, a gamma LUT (gamma look-up table) may be provided (or received). As with the method of claim 9, in some embodiments, the method may further include generating the gamma LUT. In other words, values or entries for the gamma LUT for use in video display may be determined, and the table populated accordingly.

In one embodiment, the gamma LUT may map input video levels to gamma corrected video levels, where the gamma corrected video levels of the gamma LUT are constrained by a specified minimum value or a specified maximum value, thereby excluding values for which corresponding post-OD display luminance values differ from static display luminance values by more than a specified error threshold.

In 1804, first video levels for a plurality of pixels for an image may be received by the video processing component, e.g., from a GPU. As noted above, the video processing component may be implemented by or included in any of the devices or elements of the video chain, including one or more of the GPU, video scaler, or display device (e.g., display panel), or even a standalone device, among others, as desired.

In 1806, first gamma corrected video levels may be generated (or determined) via the gamma LUT based on the first video levels. For example, the first video levels may be used as input to the gamma LUT, and the first gamma corrected video levels determined via table look-up (using the gamma LUT). The first gamma corrected video levels may correspond to post-OD corrected display luminance values that differ from corresponding static display luminance values by less than the specified error threshold. Additionally, since the gamma LUT excludes values for which corresponding post-OD display luminance values differ from static display luminance values by more than the specified error threshold, the first gamma corrected video levels may be used as "safe" or "effective" inputs to an OD table, i.e., outputs from the OD table based on the first gamma video levels (as input) may be guaranteed to correspond to display luminance values that differ from corresponding static display luminance values by less than the specified error threshold. Thus, the first gamma corrected video signals may be useable for optimized video display.

As indicated by the arrow, method elements 1804 and 1806 may be repeated in an iterative manner, e.g., with successive images (or, more specifically, video levels corresponding to successive images), thereby optimizing video display.

Figure 19:
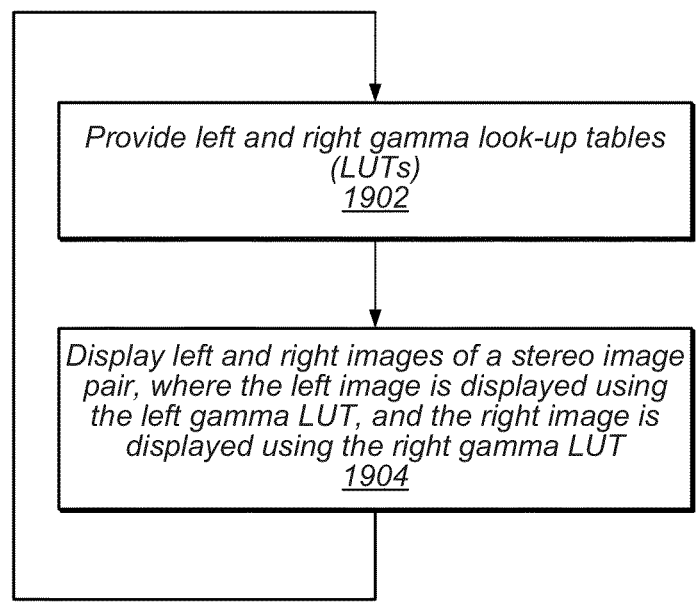
FIG. 19 is a flowchart illustrating one embodiment of a method for stereo display using multiple gamma tables, according to one embodiment.

FIG. 19—Method for Stereo Display Using Multiple Gamma Look-Up Tables

FIG. 19 illustrates a method for stereo display, e.g., for simulated 3D viewing, using multiple gamma tables. The method shown in FIG. 19 may be used in conjunction with any of the computer systems or devices shown in the figures, among other devices. In various embodiments, some of the method elements shown may be performed concurrently, in a different order than shown, or may be omitted. In some embodiments, the method may include additional (or fewer) method elements than shown. The method may be performed by the video processing component, discussed above. As shown, the method may operate as follows.

In 1902, a left gamma LUT (gamma look-up table) and a right gamma LUT may be provided. In some embodiments, the left and right gamma LUTs may be generated. In other words, values or entries for left and right gamma LUTs for use in video display may be determined, and the tables populated accordingly. The tables may be generated via any of a variety of techniques, as described above with respect to the gamma and OD LUTs.

In 1904, left and right images of a stereo image pair may be displayed (e.g., simultaneously, or in succession), where the left image is displayed using the left gamma LUT, and the right image is displayed using the right gamma LUT. In other words, the method may switch between the two gamma LUTs such that when the system (or method) displays a left image, the system (or method) uses the left gamma LUT, and when this system (or method) displays a right image, the system (or method) uses use the right gamma LUT.

For example, in one embodiment, generating first gamma corrected video levels via the gamma LUT based on the first video levels (e.g., by the video processing component) may include generating the first gamma corrected video levels via the left gamma LUT, and generating second gamma corrected video levels via the gamma LUT based on the second video levels may include generating the second gamma corrected video levels via the right gamma LUT.

As indicated by the arrow, method element 1904 may be repeated in an iterative manner, e.g., with successive stereo image pairs. The use of the left and right gamma LUTs may improve performance of the system in that gamma correction is optimized per eye (or per stereo visual channel).

Moreover, as mentioned above, video levels generally include levels for one or more additional colors, e.g., for R, G, and B (sub-)pixels, and so in some embodiments, there may be multiple, e.g., three, pairs of gamma LUTs, one (stereo) pair for each color. Additionally, in some embodiments, each of the stereo gamma LUTs may be constrained as described above.

Extended OD LUTs

As discussed above, OD LUTs may be used to ameliorate slow response times of display devices (displays), e.g., LCDs. However, prior art approaches typically limit the dependencies of such OD LUTs to input video levels. In other words, OD video levels are typically based solely on video input levels. However, various aspects of display systems may influence the response times of display devices. One such aspect is left/right dependency in stereo display systems, and use of left and right OD LUTs is described in U.S. patent application Ser. No. 13/481,243, titled "Optimizing Stereo Video Display", which was incorporated by reference above.

Various measurable attributes of video components in video systems or user's thereof can also influence performance of display devices, e.g., temperature of the display, head position and/or orientation of the user, and so forth. Accordingly, in some embodiments, OD LUTs may be extended to facilitate dependence on such attributes, as described below with reference to FIG. 20.

Figure 20:
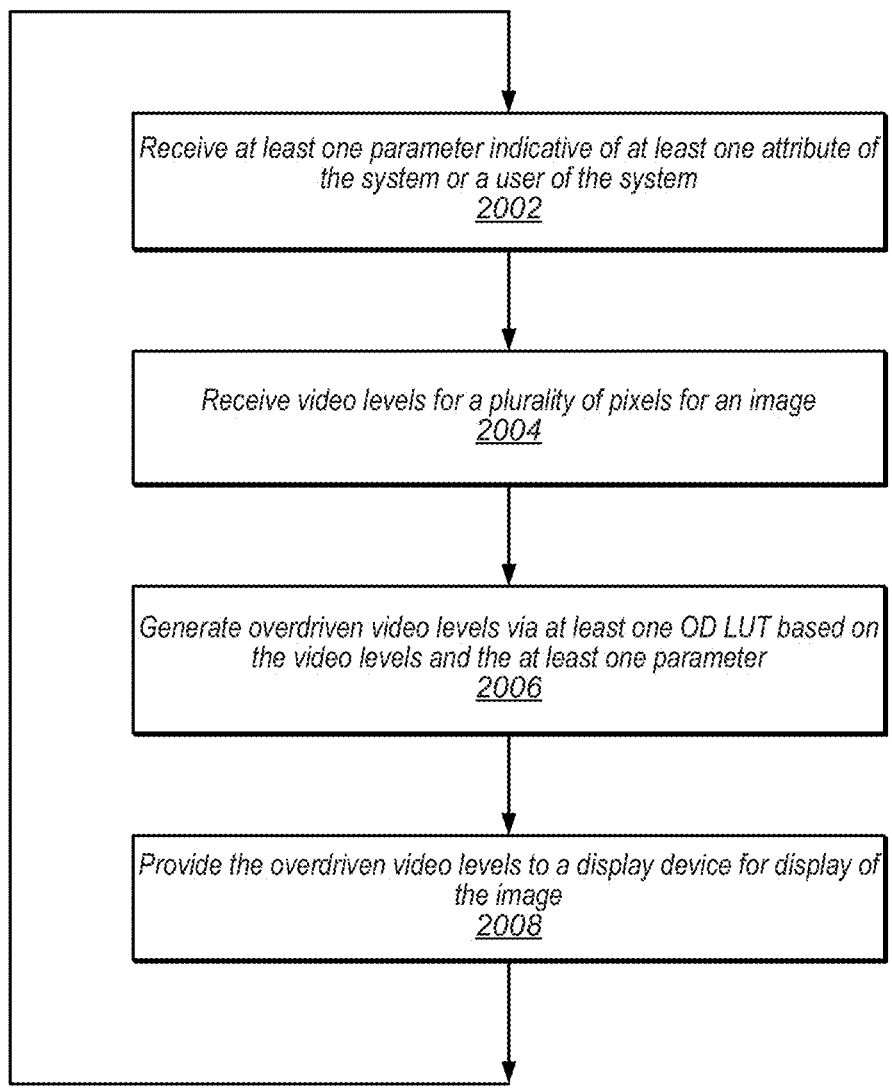
FIG. 20 is a flowchart illustrating one embodiment of a method for display using extended overdrive tables, according to one embodiment.

FIG. 20—Method for Video Display Using Extended OD LUTs

FIG. 20 flowcharts a method for video display using extended OD LUTs, according to some embodiments. In other words, at least one OD LUT may be provided, e.g., stored in a memory of the system, and used in embodiments of the method of FIG. 20, where the at least one OD LUT is dependent on input video levels and at least one parameter indicative of at least one attribute of the system or a user of the system. The method shown in FIG. 20 may be used in conjunction with any of the computer systems or devices shown in the figures, among other devices. In various embodiments, some of the method elements shown may be performed concurrently, in a different order than shown, or may be omitted. In some embodiments, the method may include additional method elements, or fewer method elements than shown. In some embodiments, the method elements may be performed by the video processing component, described above. As shown, the method may operate as follows.

As shown in 2002, at least one parameter indicative of at least one attribute of a (video) system or a user of the system may be received. For example, in one embodiment, one or more sensors may measure or detect a level of the at least one attribute (directly, or indirectly, as explained below), and the at least one parameter may represent or codify the measured or detected level, possibly via one or more correlations (as also described below in detail). Alternatively, in other embodiments, the at least one parameter may be provided manually, e.g., by the user, or may be provided by some other system communicatively coupled to the system. Examples of the at least one attribute include, but are not limited to, the user's point of view (POV), e.g., head position and/or orientation, or temperature, as discussed in more detail below.

In 2004, video levels for a plurality of pixels for an image may be received, e.g., from a GPU of the (video) system. In one embodiment, the video levels may be received to a video processing component in a video chain of the system, e.g., to a scaler or other portion(s) of the video chain implementing the video processing component. The video processing component may be included in a display device, e.g., a monitor, in a computer system, or even as a standalone device, as desired, and, as also indicated above, may be implemented in software, e.g., for execution by a processor and memory, or may be implemented in hardware, e.g., an ASIC or programmable hardware element, e.g., an FPGA, or any combination of the above.

In 2006, overdriven video levels may be generated (e.g., determined) via at least one OD LUT based on the video levels and the at least one parameter. In other words, rather than simply indexing into the OD LUT with the video level(s), the at least one parameter is also used as an index. Said another way, the effective dimensionality of the OD LUT is extended to take the at least one parameter and the video level as indices into the table, i.e., the OD LUT is extended by adding another dimension for each additional parameter. As noted above, in various embodiments, the OD LUT may be a single multi-dimensional table, or some combination of (sub)tables that collectively operate as an extended OD LUT with the appropriate dimensionality.

In 2008, the first overdriven video levels may be provided to a display device for display of the image. In some embodiments, the display device may be capable of stereo image display, e.g., for simulated 3D viewing, as described in more detail below.

As indicated by the arrow leading from 2008 back to 2002, in some embodiments, the method may include repeating method elements 2002 through 2008 one or more times in an iterative manner to display a sequence of stereo images. More explicitly, the method may repeat said receiving video levels, said receiving at least one parameter, said generating overdriven video levels, and said providing the overdriven video levels, one or more times in an iterative manner to display a sequence of images.

In some embodiments, embodiments of the method of FIG. 20 may be implemented or performed by a video processing component included in one or more of a graphics process unit (GPU), a video scaler, or a display device, among other components.

Thus, embodiments of the method of FIG. 20 may utilize an extended overdrive table (or tables) to improve performance of video display systems. Further exemplary embodiments are described below.

Further Exemplary Embodiments

It should be noted that any of the techniques and features disclosed herein may be used in any combinations, as desired. The following describes exemplary embodiments wherein various of the above-described features and techniques are incorporated into the method of FIG. 20.

POV Dependent OD LUTs

As mentioned above, attributes that may influence display response times include user POV and temperature of the display device, among others. Thus, in one exemplary embodiment, the at least one attribute includes a point of view (POV) of the user of the system. This may be an important consideration because the angle dependent dispersion of the light from the (pixel) cells is non-isotropic, and therefore the luminance and/or color may vary based on the angle of view, possibly at the pixel level.

Figure 21A:
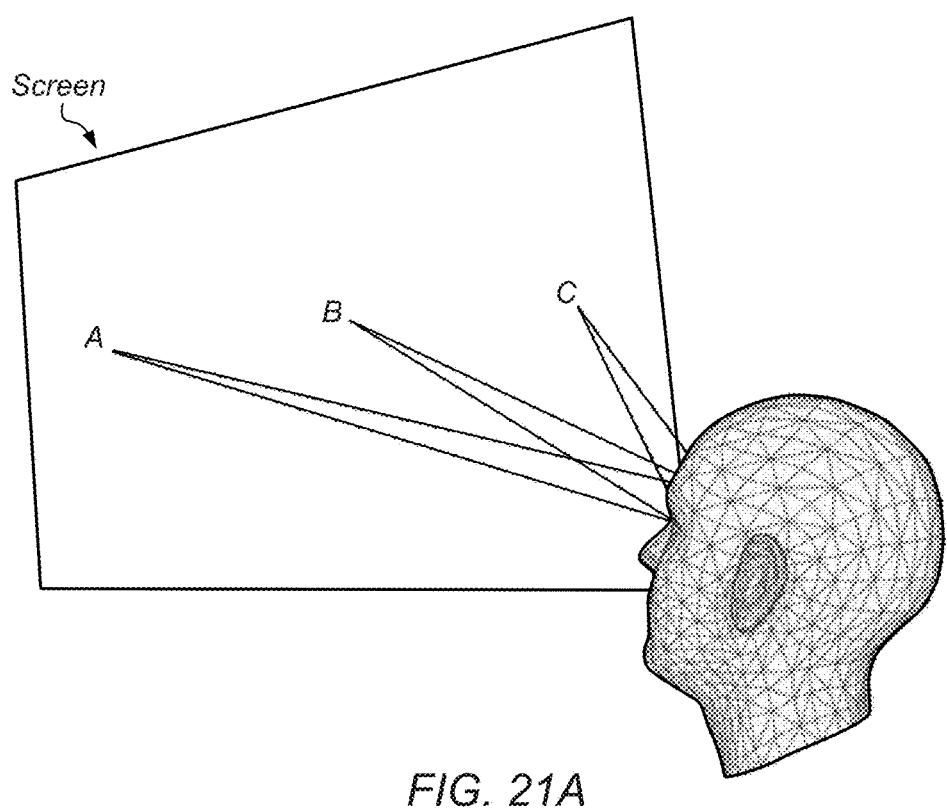
FIGS. 21A and 21B illustrate dependence of view angle, and thus, light dispersion, on point of view (POV), according to one embodiment.
Figure 21B:
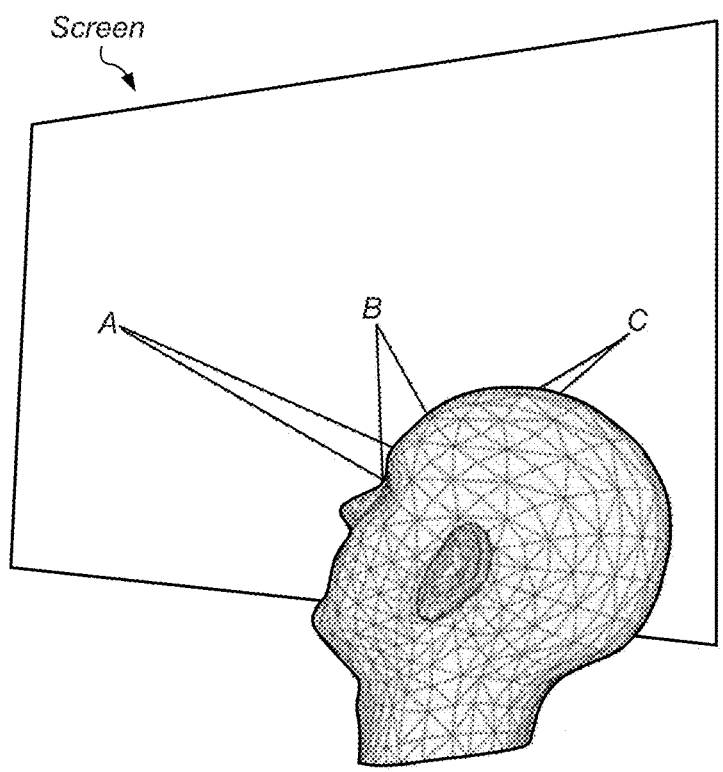

FIGS. 21A and 21B illustrate why POV may be an important consideration regarding perceived luminance (and possibly color) of displayed images. POV may include a position of the user's head, and/or an orientation of the user's head, i.e., the user's left and right eye positions and/or orientations with respect to the display. For example, in one embodiment, a head tracking device may be coupled to the video processing component, and may be configured to detect the POV of the user. Receiving the at least one parameter may include receiving an indication of the POV from the head-tracking device. In some embodiments, the head tracking device may be worn by the user (may be head mounted), although in other embodiments, it may not be. For example, in one embodiment, the head tracking device may determine the POV "remotely", e.g., via a camera (or other type of sensor) with associated hardware or software that analyzes images (or other signals) of the user's head (or eyes) to determine the POV. Any other techniques for determining POV may be used as desired.

In the exemplary case shown in FIG. 21A, the respective angles between the head and the display (screen) at points A, B, and C (e.g., at respective pixels or display cells) may each have a corresponding dispersion, and so may require respective OD LUT values to achieve uniform or proper perception (e.g., of the luminance and/or color) by the viewer/user. In other words, since the angles to screen pixels or cells at screen positions A, B, and C are unique, the determination of the OD LUT contribution from each pixel or cell may be distinct, where each pixel or cell has its own angle dependent transition from one gray (or color) level value to the next. When the user moves his (or her) head, the angles made with each pixel or cell (including points A, B, and C) change. Moreover, FIG. 21B illustrates how these angles (at points A, B, and C) may change as the viewer tilts his head back. In other words, in some embodiments, the angles (and thus, dispersion) may change if the orientation of the user's head changes, even if the user's head does not change position, and so in some embodiments, the OD LUT may be extended (and indexed accordingly) for POV dependence, thereby providing OD values for video levels at any valid POV.

In various embodiments, the POV dependence may be implemented at different levels, i.e., at different resolutions. Note, for example, that the POV effect for a pixel or cell on the left side of the screen may be technically different from a pixel or cell on the right side of the screen, as the POV is different with respect to each of the pixels or cells. Accordingly, in some embodiments, the POV dependence may be implemented at the pixel or cell level. In other words, since the user or viewer has a unique POV with respect to each pixel or cell of the display, in some embodiments, the POV may be computed with respect to each pixel or cell, and the appropriate OD value retrieved from the extended OD LUT(s) per pixel or cell.

In other embodiments, pixels or cells may be grouped into regions, e.g., based on a specified level of POV effect, and the POV extension(s) to the OD LUT(s) may be populated and indexed accordingly. Said another way, the view angles that define POV effects on light dispersion may be partitioned or discretized based on POV effect, and the OD LUT(s) extended accordingly. During operation, the OD LUT(s) may be accessed appropriately for each pixel or cell based on the particular POV angle partition they occupy.

Thus, in one embodiment of the method of FIG. 20, the at least one parameter may be indicative of POV (of the viewer or user), and may be used to index into the (extended) OD LUT(s) for the generation of the overdriven video levels of 2006.

Temperature Dependent OD LUTs

As also mentioned above, the response time of some display technologies, e.g., LCDs, may depend on temperature. Accordingly, in some embodiments, the at least one attribute may include a temperature of at least one component of a display chain for the system. In one exemplary embodiment, the at least one component of the display chain for the system may be or include the display device, e.g., an LCD. More specifically, in some embodiments, the temperature of at least one component of the display chain for the system may be or include a temperature of a display panel of the display device. The temperature of the display panel may be determined via one or more sensors located on or near the display panel, or one or more sensors located on or near another component of the display chain, where the temperature of the other component of the display chain may be a proxy for the temperature of the display panel. In other exemplary embodiments, the temperature of the at least one component may include that of a polarization switch of the display device.

More generally, however, since the display characteristics depend on display temperature (or more specifically, the temperature of the display material, e.g., LC material), temperatures on or near the display panel may more accurately reflect those of the display material, and may be more easily measured, e.g., by situating one or more sensors on or near the display panel. For example, in one exemplary embodiment, one or more temperature sensors may be located on a main or primary electronics board mounted behind the display (or display panel), and measurements made by these sensors are indicative of the display temperature (or display panel temperature).

In other words, in some embodiments, the parameter may be indicative of display temperature (or display panel temperature) via correlation with one or more other measured temperatures. Since the temperature of the liquid crystal material in the display may be difficult to measure, particularly for each pixel or cell of the display, in one exemplary embodiment, temperature(s) around the display may be measured, and then correlated to the LC temperature. For example, one or more temperature sensors may be placed in or around the system electronics, and each sensor's behavior monitored as the ambient temperature varied. Typically, if the sensors are near the display panel, the sensors more or less follow similar curves, e.g., with respective offsets, and so each of the sensors may be representative of the "temperature of the system", or more specifically, the display panel. Accordingly, any of the sensors may be used for operational measurements.

OD tables may then be generated from data taken at different stable room (ambient) temperatures. For example, the system may be placed in a temperature chamber for long enough to reach thermal equilibrium, e.g., 2 hours, at fixed known temperatures, and measurements made regarding display response times. These measurements may then be used to generate the OD tables, resulting in OD tables as a function of ambient or room temperature, e.g., OD(18 C), OD(20 C), etc. Measurements may also be recorded from a representative temperature sensor (e.g., located in or near the system electronics, e.g., on the main electronics board mounted behind the display (or display panel) mentioned above), and so the relation between this measured temperature and ambient or room temperature may be determined.

Based on the above, during operation, the sensor (located on or near the display panel) may be read, e.g., at 45 C, which may be translated to or correlated with an ambient or room temperature of 22 C, which may be used to index into the extended OD LUT, e.g., OD(22 C). Of course, this is but one exemplary approach. In another exemplary embodiment, the sensor measurement may be correlated directly with display response times, and used to index into the table. In other words, the temperature of the display panel may be determined via the one or more sensors located on or near another component of the display chain operating as a proxy for the temperature of the display panel, and the parameter may correspond to an ambient temperature, where the ambient temperature corresponds to the temperature of the display panel. Note that via such correlations, the parameter is still indicative of the temperature of the display panel (and even the display panel materials (LC)).

Thus, the OD LUT(s) may be dependent on the temperature of the LC material (and thus, on the temperature of the display device or panel) via use of measured temperatures as proxies for this temperature, since the temperature of the LC material itself may not be measured.

Stereo Display With Extended OD LUTs

The extended OD LUT(s) may be used in combination with any of the stereo display systems and techniques described above. For example, in some embodiments, the system may include or be coupled to a display device, which may be or include a display panel and a polarization switch (PS). The display panel used may be any LCD or any other type of pixelated panel display used in a time-sequential stereo imaging system, e.g., OLED, plasma display, etc. The image may be a stereo image that includes left and right images. The display device may be configured to display the left image on the display panel with the PS set to a first state, where the left image includes or utilizes light in a first polarized state, and display the right image on the display panel with the PS set to a second state, wherein the right image includes or utilizes light in a second polarized state, and where the second polarized state is orthogonal to the first polarized state. In other words, in some embodiments, the method may invoke display of the left image on the display panel with the PS set to the first state, where the left image includes light in the first polarized state, and invoke display of the right image on the display panel with the PS set to the second state, where the right image includes light in the second polarized state, where the second polarized state is orthogonal to the first polarized state.

As described above, any orthogonal polarized state pairs may be used as desired. For example, in one embodiment, the first and second polarized states may be or include orthogonal linear polarization states. In other embodiments, the first and second polarization states may be or include orthogonal circular polarization states. As further examples, combinations of such states may also be used, i.e., orthogonal elliptical polarization states.

In some cases, performance of the PS, e.g., PS response times and/or PS drive levels (that determine polarization levels for the PS cells), may be affected by attributes of the system or the user of the system. Thus, in some embodiments, the PS may have an associated OD LUT, which may be extended to include dependency on such attributes. For example, the response times for the PS may be influenced by temperature or viewer POV, and so, in some embodiments, the PS OD LUT(s) may be dependent not only on input video levels, but may be further dependent on (and indexed based on) temperature and/or POV, in a similar manner as described above regarding the display panel's OD LUT(s).

In some embodiments, the system may also include or be coupled to eyewear. For example, in one embodiment, the system may include a panel display, and the eyewear may include a left shutter, a right shutter, and a shutter switch (SS) configured to switchably open and close the left shutter or the right shutter, thereby blocking one (or the other) eye's view of the panel display. The method may include displaying (or invoking display of) the left image to a user by opening the left shutter and closing the right shutter, and displaying (or invoking display of) the right image to the user by opening the right shutter and closing the left shutter.

In some embodiments, the extended OD LUT may be further expanded to include respective left and right OD LUTs (or sub-LUTs), as described above with respect to the section titled "Stereo Look-Up Tables" and the method of FIG. 9. For example, in one embodiment, the at least one OD LUT includes a left OD LUT and a right OD LUT. Referring to the method of FIG. 20, the receiving video levels for a plurality of pixels for an image (of 2004) may include receiving first video levels for a plurality of pixels for a left image of a stereo image, and receiving second video levels for the plurality of pixels for a right image of the stereo image pair. Accordingly, in some embodiments, the generation of overdriven video levels via the at least one OD LUT based on the video levels and the at least one parameter (of 2006) may include generating first overdriven video levels via the left OD LUT based on the first video levels and the at least one parameter, and generating second overdriven video levels via the right OD LUT based on the second video levels and the at least one parameter.

Similarly, the provision of the overdriven video levels to a display device for display of the image (of 2008) may include providing the first overdriven video levels to the display device for display of the left image, and providing the second overdriven video levels to the display device for display of the right image.

Moreover, in one exemplary embodiment of this approach, the at least one attribute (according to which the OD LUT may be extended) may include a point of view (POV) of a user of the system, where the POV includes a position of the user's head, and/or an orientation of the user's head. Alternatively, or additionally, the at least one attribute may include a temperature of at least one component of a display chain for the system, as discussed above in detail.

Gamma Compression with Extended OD LUTs

In some embodiments, the gamma compression techniques described above with respect to FIG. 18 may be used with embodiments of the extended OD LUTs. For example, in one exemplary embodiment, the memory of the system may further store at least one gamma look-up table (LUT) that maps input video levels to gamma corrected video levels, where the gamma corrected video levels of the gamma LUT are constrained by a specified minimum value and/or a specified maximum value, thereby excluding values for which corresponding post-OD display luminance values differ from static display luminance values by more than a specified error threshold.

Accordingly, prior to using the extended OD LUT(s), input video levels for the plurality of pixels for the image may be received, and the video levels received in 2004 above may be generated via the gamma LUT based on the input video levels, where the video levels are or include gamma corrected video levels that correspond to post-OD display luminance values that differ from corresponding static display luminance values by less than the specified error threshold, i.e., the first gamma corrected video levels may correspond to post-OD display luminance values that differ from corresponding static display luminance values by less than the specified error threshold. In some embodiments, the video levels may include respective color video levels for respective color sub-pixels, where the at least one gamma LUT includes respective gamma LUTs for the color video levels. Moreover, in some embodiments, dual or stereo gamma tables may be used, e.g., as described above with respect to the method of FIG. 19. Thus, in one exemplary embodiment (with three colors), the method may utilize 6 gamma LUTs (left and right gamma LUTs for each of the three colors or color channels) and 6 extended OD LUTs (left and right OD LUTs for each of the three colors, extended to further depend on the at least one parameter/attribute). Note, however, that the number and types of tables utilized may be different, depending on the number and types of colors or color channels supported. Alternatively, in some embodiments, the same tables may be used for all the colors, e.g., a left extended OD LUT for all colors, a right extended OD LUT for all colors, etc.

Thus, in some embodiments of the method of FIG. 20, each of the first and second video levels may include respective color video levels for respective color sub-pixels. The gamma LUT may include respective gamma LUTs for different color video levels, the left (extended) OD LUT may include respective left (extended) OD LUTs for the different color video levels, and the right (extended) OD LUT may include respective right (extended) OD LUTs for the different color video levels.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:
1. A system, comprising:
a video processing component; and
a memory, comprised in or coupled to the video processing component, wherein the memory stores:
at least one overdrive (OD) look-up table (LUT), wherein the at least one OD LUT is dependent on input video levels and at least one parameter indicative of at least one attribute of the system or a user of the system, wherein the at least one attribute comprises a point of view (POV) of a user of the system with respect to the display device, wherein the POV comprises one or more of:

a position of the user's head with respect to a display panel or screen of the display device; or an orientation of the user's head with respect to the display panel or screen of the display device;

wherein the video processing component is configured to:

receive the at least one parameter indicative of at least one attribute of the system or a user of the system;

receive video levels for a plurality of pixels for an image;

generate overdriven video levels via the at least one OD LUT based on the video levels and the at least one parameter;

provide the overdriven video levels to a display device for display of the image;

repeat said receive video levels, said receive at least one parameter, said generate overdriven video levels, and said provide the overdriven video levels, one or more times in an iterative manner to display a sequence of images.

2. The system of claim 1, wherein said receiving the at least one parameter comprises receiving an indication of the POV from a head tracking device coupled to the video processing component, wherein the head-tracking device is configured to detect the POV of the user.

3. The system of claim 1,
wherein the at least one attribute comprises a temperature of at least one component of a display chain for the system.

4. The system of claim 3, wherein the at least one component of the display chain for the system comprises the display device.

5. The system of claim 4, wherein the temperature of at least one component of the display chain for the system comprises a temperature of a display panel of the display device.

6. The system of claim 5, wherein the temperature of the display panel is determined via one or more of:
one or more sensors located on or near the display panel; or
one or more sensors located on or near another component of the display chain, wherein the temperature of the other component of the display chain comprises a proxy for the temperature of the display panel.

7. The system of claim 6, wherein the temperature of the display panel is determined via the one or more sensors located on or near another component of the display chain operating as a proxy for the temperature of the display panel, wherein the parameter corresponds to an ambient temperature, and wherein the ambient temperature corresponds to the temperature of the display panel.

8. The system of claim 1,
wherein the at least one OD LUT comprises:
a left OD LUT; and
a right OD LUT;
wherein to receive video levels for a plurality of pixels for an image, the video process component is configured to:
receive first video levels for a plurality of pixels for a left image of a stereo image; and
receive second video levels for the plurality of pixels for a right image of the stereo image pair;
wherein to generate overdriven video levels via the at least one OD LUT based on the video levels and the at least one parameter, the video process component is configured to:
generate first overdriven video levels via the left OD LUT based on the first video levels and the at least one parameter; and
generate second overdriven video levels via the right OD LUT based on the second video levels and the at least one parameter; and
wherein to provide the overdriven video levels to a display device for display of the image, the video process component is configured to:
provide the first overdriven video levels to the display device for display of the left image; and
provide the second overdriven video levels to the display device for display of the right image.

9. The system of claim 1, further comprising the display device, wherein the display device comprises a liquid crystal display (LCD) panel and a polarization switch (PS), wherein the image comprises a stereo image, comprising a right image and a left image, wherein the display device is configured to:
display the left image on the LCD with the PS set to a first state, wherein the left image comprises light in a first polarization state; and
display the right image on the LCD with the PS set to a second state, wherein the right image comprises light in a second polarization state, wherein the second polarization state is orthogonal to the first polarization state.

10. The system of claim 9, wherein the first and second polarization states comprise one or more of:
orthogonal linear polarization states; or
orthogonal circular polarization states.

11. The system of claim 9, further comprising:
eyewear, coupled to the display device, the eyewear comprising:
a left shutter;
a right shutter; and
a shutter switch (SS) configured to switchably open and close the left shutter or the right shutter;
wherein the eyewear is configured to:
display the left image to a user by opening the left shutter and closing the right shutter; and
display the right image to the user by opening the right shutter and closing the left shutter.

12. The system of claim 9,
wherein the at least one attribute comprises a point of view (POV) of a user of the system, wherein the POV comprises one or more of:
a position of the user's head; or
an orientation of the user's head.

13. The system of claim 12,
wherein the at least one attribute further comprises a temperature of at least one component of a display chain for the system.

14. The system of claim 9,
wherein the at least one attribute comprises a temperature of at least one component of a display chain for the system.

15. The system of claim 1, further comprising the display device, wherein the display device comprises;
an LCD;
an OLED (organic light emitting diode); or
a plasma display.

16. The system of claim 1, wherein the video processing component is comprised in one or more of:
a graphics process unit (GPU);
a video scaler; or
a display device.

17. The system of claim 1,
wherein the memory further stores:
at least one gamma look-up table (LUT) that maps input video levels to gamma corrected video levels wherein the gamma corrected video levels of the gamma LUT are constrained by a specified minimum value or a specified maximum value, thereby excluding values for which corresponding post-OD display luminance values differ from static display luminance values by more than a specified error threshold;
wherein the video process component is further configured to:
receive input video levels for the plurality of pixels for the image;
generate the video levels via the gamma LUT based on the input video levels, wherein the video levels comprise gamma corrected video levels, and wherein the gamma corrected video levels correspond to post-OD display luminance values that differ from corresponding static display luminance values by less than the specified error threshold.

18. The system of claim 17,
wherein the video levels comprises respective color video levels for respective color sub-pixels, wherein the at least one gamma LUT comprises respective gamma LUTs for the color video levels.

19. The system of claim 1,
wherein the video levels comprises respective color video levels for respective color sub-pixels, wherein the at least one OD LUT comprises respective OD LUTs for the color video levels.

20. A non-transitory computer accessible memory medium, configured with program instructions executable by a processor to implement:
at least one overdrive (OD) look-up table (LUT) for a video system, wherein the at least one OD LUT is dependent on input video levels and at least one parameter indicative of at least one attribute of the system or a user of the system, wherein the at least one attribute comprises a point of view (POV) of a user of the system with respect to the display device, wherein the POV comprises one or more of:
a position of the user's head with respect to a display panel or screen of the display device; or
an orientation of the user's head with respect to the display panel or screen of the display device;
wherein the program instructions are executable to:
receive the at least one parameter indicative of at least one attribute of the video system or a user of the video system;
receive video levels for a plurality of pixels for an image;
generate overdriven video levels via the at least one OD LUT based on the video levels and the at least one parameter;
provide the overdriven video levels to a display device for display of the image;
repeat said receive video levels, said receive at least one parameter, said generate overdriven video levels, and said provide the overdriven video levels, one or more times in an iterative manner to display a sequence of images.

21. A method, comprising:
providing at least one overdrive (OD) look-up table (LUT) for a video system, wherein the at least one OD LUT is dependent on input video levels and at least one parameter indicative of at least one attribute of the system or a user of the system, wherein the at least one attribute comprises a point of view (POV) of a user of the system with respect to the display device, wherein the POV comprises one or more of:
a position of the user's head with respect to a display panel or screen of the display device; or
an orientation of the user's head with respect to the display panel or screen of the display device;
receiving the at least one parameter indicative of at least one attribute of the video system or a user of the video system;
receiving video levels for a plurality of pixels for an image;
generating overdriven video levels via the at least one OD LUT based on the video levels and the at least one parameter;
providing the overdriven video levels to a display device for display of the image;
repeating said receiving video levels, said receiving at least one parameter, said generating overdriven video levels, and said providing the overdriven video levels, one or more times in an iterative manner to display a sequence of images.

22. The non-transitory computer accessible memory medium of claim 20, wherein said receiving the at least one parameter comprises receiving an indication of the POV from a head tracking device coupled to the video processing component, wherein the head-tracking device is configured to detect the POV of the user.

23. The non-transitory computer accessible memory medium of claim 20, wherein the at least one attribute comprises a temperature of at least one component of a display chain for the system.

24. The non-transitory computer accessible memory medium of claim 23, wherein the at least one component of the display chain for the system comprises the display device, wherein the temperature of at least one component of the display chain for the system comprises a temperature of a display panel of the display device, and wherein the temperature of the display panel is determined via one or more of:
one or more sensors located on or near the display panel; or
one or more sensors located on or near another component of the display chain, wherein the temperature of the other component of the display chain comprises a proxy for the temperature of the display panel.

25. The non-transitory computer accessible memory medium of claim 24, wherein the temperature of the display panel is determined via the one or more sensors located on or near another component of the display chain operating as a proxy for the temperature of the display panel, wherein the parameter corresponds to an ambient temperature, and wherein the ambient temperature corresponds to the temperature of the display panel.

26. The non-transitory computer accessible memory medium of claim 20,
wherein the at least one OD LUT comprises:
a left OD LUT; and
a right OD LUT;
wherein to receive video levels for a plurality of pixels for an image, the video process component is configured to:
receive first video levels for a plurality of pixels for a left image of a stereo image; and
receive second video levels for the plurality of pixels for a right image of the stereo image pair;
wherein to generate overdriven video levels via the at least one OD LUT based on the video levels and the at least one parameter, the video process component is configured to:
generate first overdriven video levels via the left OD LUT based on the first video levels and the at least one parameter; and
generate second overdriven video levels via the right OD LUT based on the second video levels and the at least one parameter; and wherein to provide the overdriven video levels to a display device for display of the image, the video process component is configured to:
provide the first overdriven video levels to the display device for display of the left image; and
provide the second overdriven video levels to the display device for display of the right image.

27. The method of claim 21, wherein said receiving the at least one parameter comprises receiving an indication of the POV from a head tracking device coupled to the video processing component, wherein the head-tracking device is configured to detect the POV of the user.

28. The method of claim 21, wherein the at least one attribute comprises a temperature of at least one component of a display chain for the system.

29. The method of claim 28, wherein the at least one component of the display chain for the system comprises the display device, wherein the temperature of at least one component of the display chain for the system comprises a temperature of a display panel of the display device, and wherein the temperature of the display panel is determined via one or more of:
one or more sensors located on or near the display panel; or
one or more sensors located on or near another component of the display chain, wherein the temperature of the other component of the display chain comprises a proxy for the temperature of the display panel.

30. The method of claim 29, wherein the temperature of the display panel is determined via the one or more sensors located on or near another component of the display chain operating as a proxy for the temperature of the display panel, wherein the parameter corresponds to an ambient temperature, and wherein the ambient temperature corresponds to the temperature of the display panel.

31. The method of claim 21,
wherein the at least one OD LUT comprises:
a left OD LUT; and
a right OD LUT;
wherein to receive video levels for a plurality of pixels for an image, the video process component is configured to:
receive first video levels for a plurality of pixels for a left image of a stereo image; and
receive second video levels for the plurality of pixels for a right image of the stereo image pair;
wherein to generate overdriven video levels via the at least one OD LUT based on the video levels and the at least one parameter, the video process component is configured to:
generate first overdriven video levels via the left OD LUT based on the first video levels and the at least one parameter; and
generate second overdriven video levels via the right OD LUT based on the second video levels and the at least one parameter; and
wherein to provide the overdriven video levels to a display device for display of the image, the video process component is configured to:
provide the first overdriven video levels to the display device for display of the left image; and
provide the second overdriven video levels to the display device for display of the right image.

* * * * *